US008696784B2

(12) United States Patent
Kottegoda et al.

(10) Patent No.: US 8,696,784 B2
(45) Date of Patent: *Apr. 15, 2014

(54) COMPOSITION AND METHOD FOR SUSTAINED RELEASE OF AGRICULTURAL MACRONUTRIENTS

(71) Applicants: Nilwala Kottegoda, Malwana (LK); Gayan Priyadharshana, Malwana (LK); Chanaka Sandaruwan, Malwana (LK); Damayanthi Dahanayake, Malwana (LK); Sunanda Gunasekara, Malwana (LK); A. J. Gehan Amaratunga, Malwana (LK); Veranja Karunaratne, Malwana (LK)

(72) Inventors: Nilwala Kottegoda, Malwana (LK); Gayan Priyadharshana, Malwana (LK); Chanaka Sandaruwan, Malwana (LK); Damayanthi Dahanayake, Malwana (LK); Sunanda Gunasekara, Malwana (LK); A. J. Gehan Amaratunga, Malwana (LK); Veranja Karunaratne, Malwana (LK)

(73) Assignee: Sri Lanka Institute of Nanotechnology (Pvt) Ltd, Homagama (LK)

( * ) Notice: Subject to any disclaimer, the term of this patent is extended or adjusted under 35 U.S.C. 154(b) by 0 days.

This patent is subject to a terminal disclaimer.

(21) Appl. No.: 13/707,985

(22) Filed: Dec. 7, 2012

(65) Prior Publication Data

US 2013/0098125 A1    Apr. 25, 2013

Related U.S. Application Data

(63) Continuation-in-part of application No. 12/794,741, filed on Jun. 5, 2010, now Pat. No. 8,361,185.

(51) Int. Cl.
*C05C 9/00* (2006.01)
*C05C 11/00* (2006.01)

(52) U.S. Cl.
USPC ............... 71/29; 71/33; 71/54; 71/58

(58) Field of Classification Search
USPC .................................... 71/11–63
See application file for complete search history.

(56) References Cited

U.S. PATENT DOCUMENTS

| | | | |
|---|---|---|---|
| 3,902,886 A | 9/1975 | Banin | |
| 4,219,349 A | 8/1980 | Bardsley | |
| 4,849,006 A | 7/1989 | Knudson, Jr. | |
| 5,433,766 A * | 7/1995 | Ming et al. | 71/36 |
| 5,451,242 A * | 9/1995 | Ming et al. | 71/36 |
| 6,261,997 B1 | 7/2001 | Rubin et al. | |
| 6,726,934 B1 | 4/2004 | Prokop et al. | |
| 6,821,928 B2 | 11/2004 | Ruskin | |
| 7,211,275 B2 | 5/2007 | Ying et al | |
| 7,252,697 B2 | 8/2007 | Liao et al. | |
| 8,361,185 B2 * | 1/2013 | Kottegoda et al. | 71/29 |
| 2004/0091417 A1 | 5/2004 | Yadav | |
| 2004/0231231 A1 | 11/2004 | Cataldo et al. | |
| 2009/0169524 A1 | 7/2009 | Katti et al. | |
| 2010/0215556 A1 | 8/2010 | Domszy et al. | |
| 2011/0296885 A1 | 12/2011 | Nilwala et al. | |
| 2011/0296887 A1 | 12/2011 | Kottegoda et al. | |

OTHER PUBLICATIONS

Kim, K. S., Suppression of fertilizer N loss through massive urea intercalation into montmorillonite, Kyungpook National University, Thesis, 2009.

(Continued)

*Primary Examiner* — Wayne Langel
(74) *Attorney, Agent, or Firm* — Alston & Bird LLP

(57) ABSTRACT

A fertilizer composition wherein a nitrogen containing macronutrient is adsorbed on the surface of hydroxyapatite phosphate nanoparticles. Said fertilizer composition slowly releases the nitrogen containing macronutrient to soil.

19 Claims, 28 Drawing Sheets

Release behavior comparison for Urea, Urea-HAP nanoparticle chip, Urea-HAP nanoparticle powder and Urea and HAP macroparticles in water.

(56) References Cited

OTHER PUBLICATIONS

Kottegoda, N., et al., "A Green slow-release fertilizer composition based on urea-modified hydroxyapatite nanoparticles encapsulated wood," *Current Science*, Jul. 10, 2011, vol. 101(1) pp. 73-78. See figure 4.

International Search Report from PCT/IB2012/057080, dated Aug. 20, 2013.

\* cited by examiner

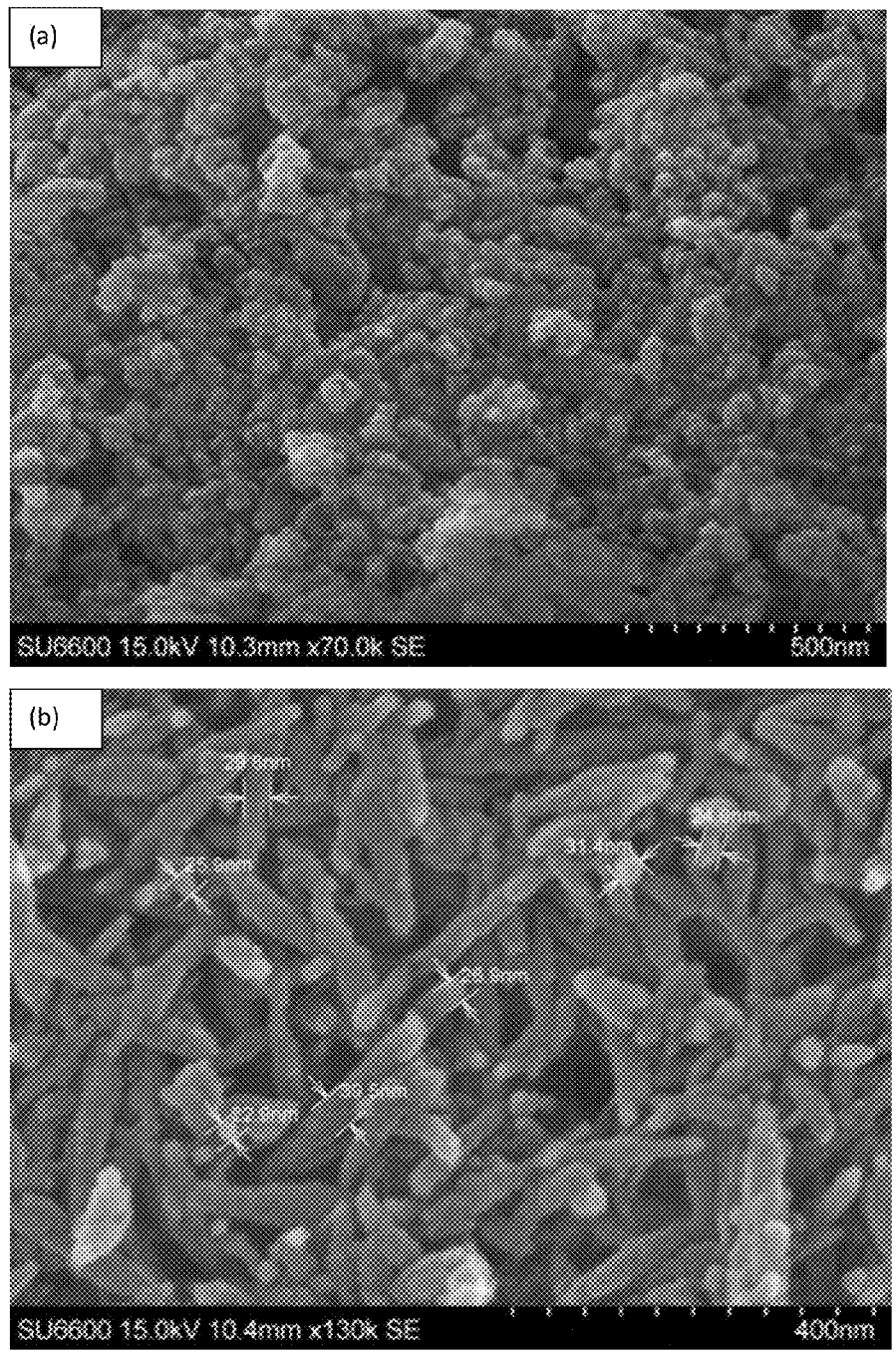
Figure 1: SEM images of an embodiment of the present invention showing the urea adsorbed HAP nanoparticles prepared by template method (a) as synthesized and (b) after 2 hrs of synthesis, resulting as a solid chip, showing nanobeads and bead-chain-like structures obtained by the directional growth of nanobeads, respectively.

Figure 2: SEM images of an embodiment of the present invention where showing the urea adsorbed HAP nanoparticles foliage formulations prepared with HAP:Urea (a) 1:1, (b) 1:3, (c) 1:4, (d) 1:5 and (e) 1:6.

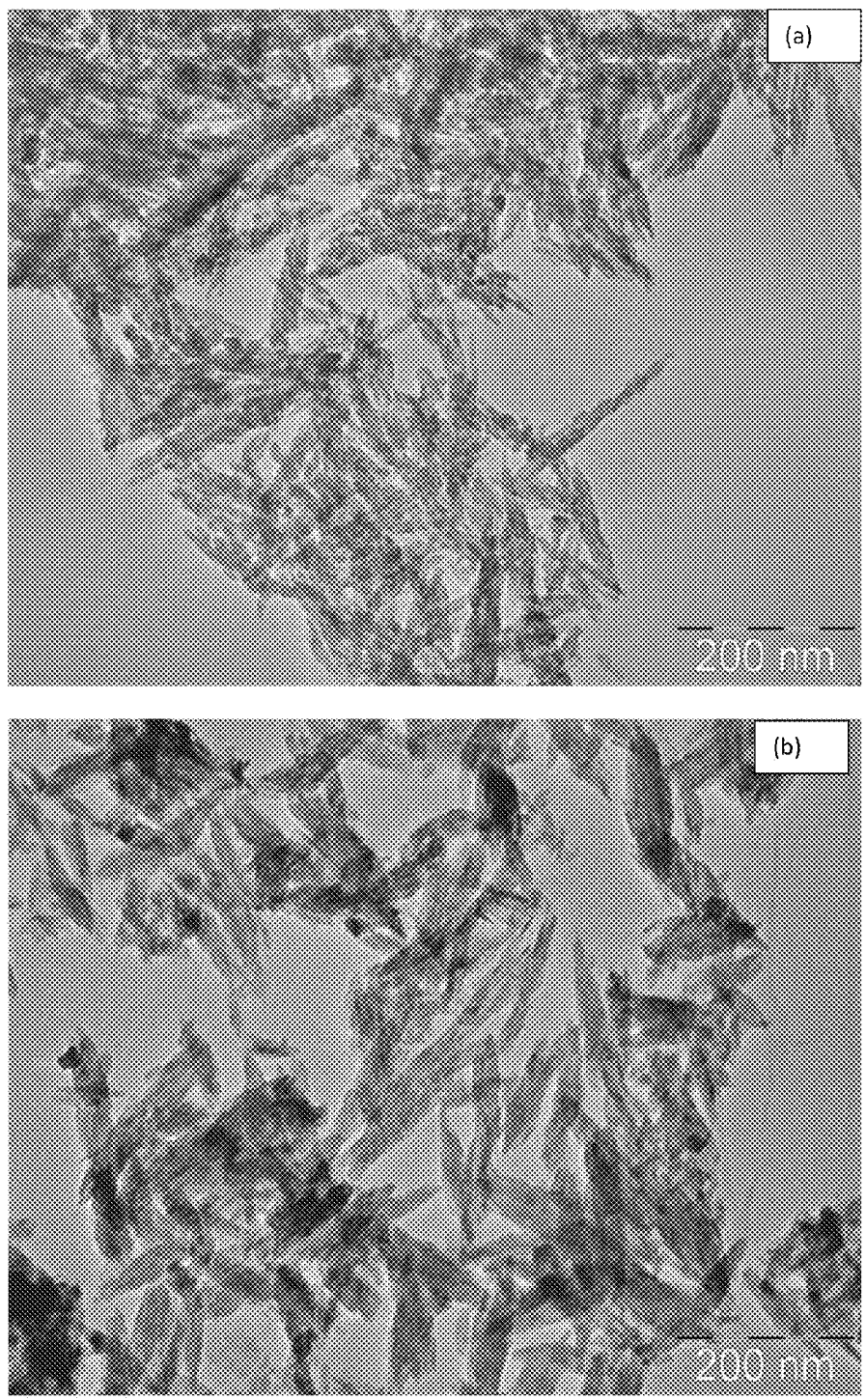
Figure 3: TEM images of an embodiment of the present invention showing (a) synthesized HAP nanoparticles and (b) urea adsorbed HAP nanoparticles.

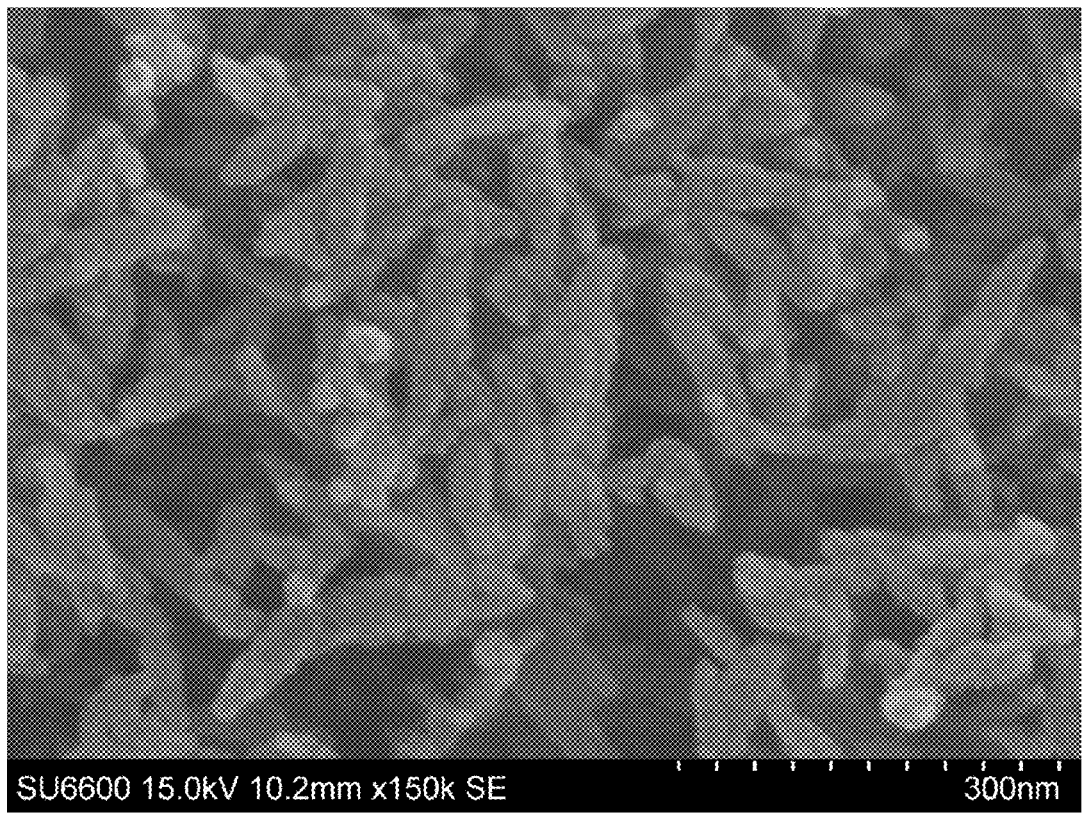
Figure 4: SEM image of an embodiment of the present invention showing the bead-chain-like structure of the HAP-urea nanoparticles formed by the Sol-Gel method.

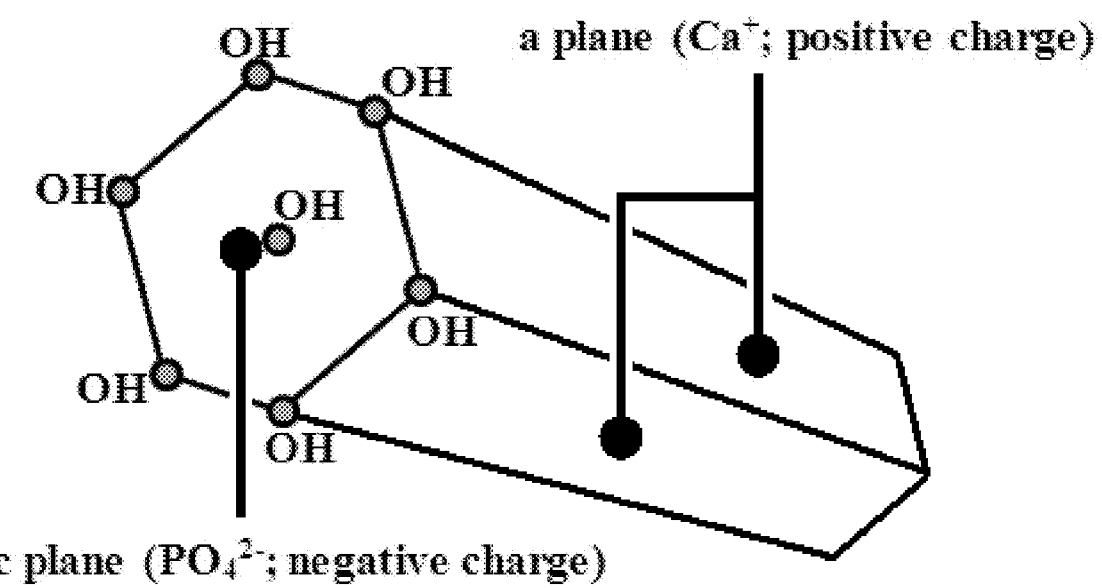
Figure 5: Crystallographic representation of HAP nanoparticles.

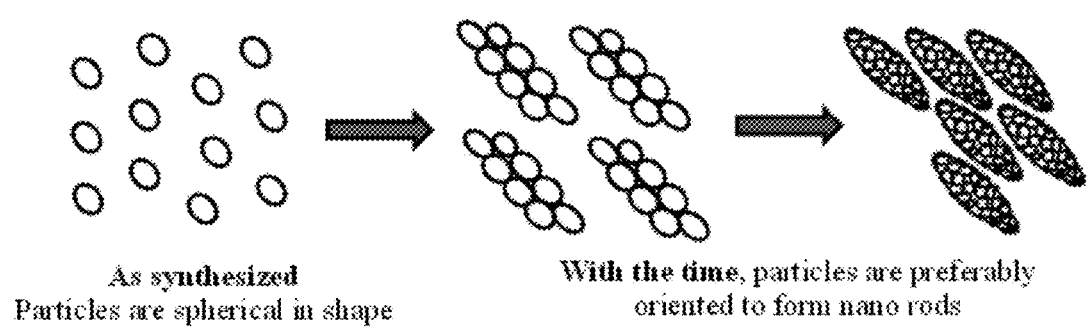
Figure 6: Schematic representation of the directional growth of bead-like nanoparticles into bead-chain-like particles.

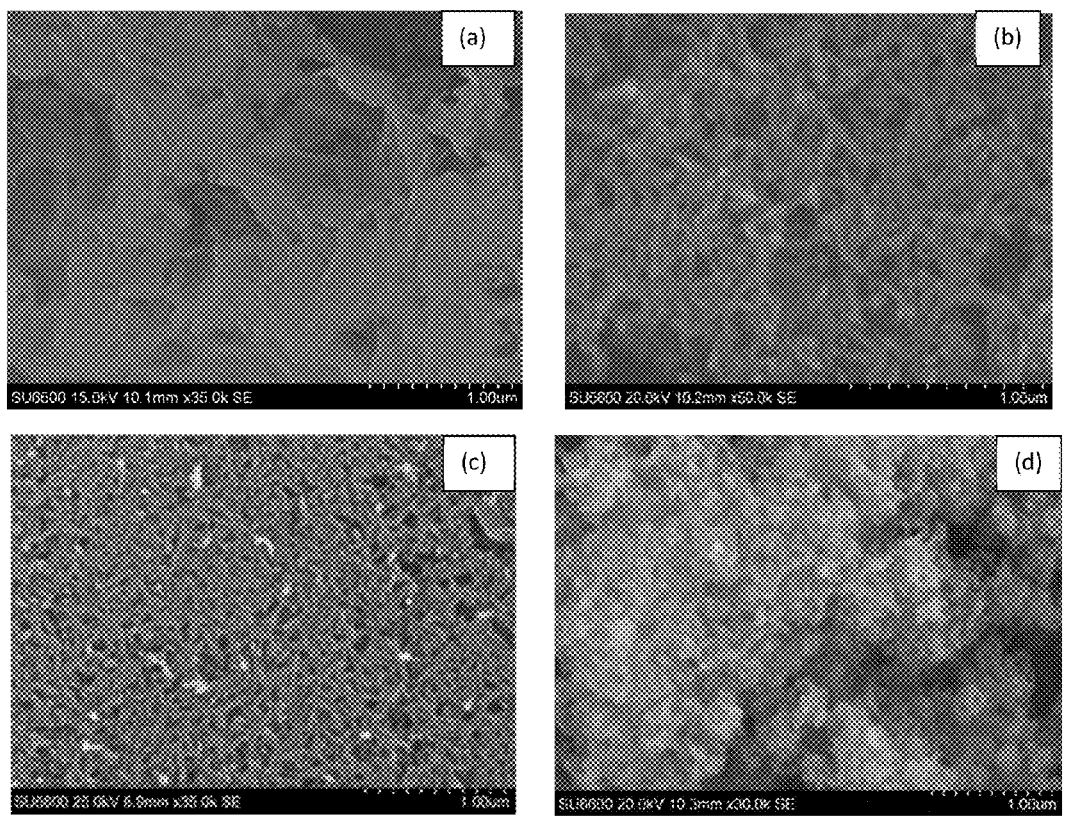
Figure 7: SEM images of HAP nanoparticles formed with different addition rates of phosphoric acid, (a) 250 ml min$^{-1}$, (b) 70 ml min$^{-1}$, (c) 20 ml min$^{-1}$ and (d) 6 ml min$^{-1}$.

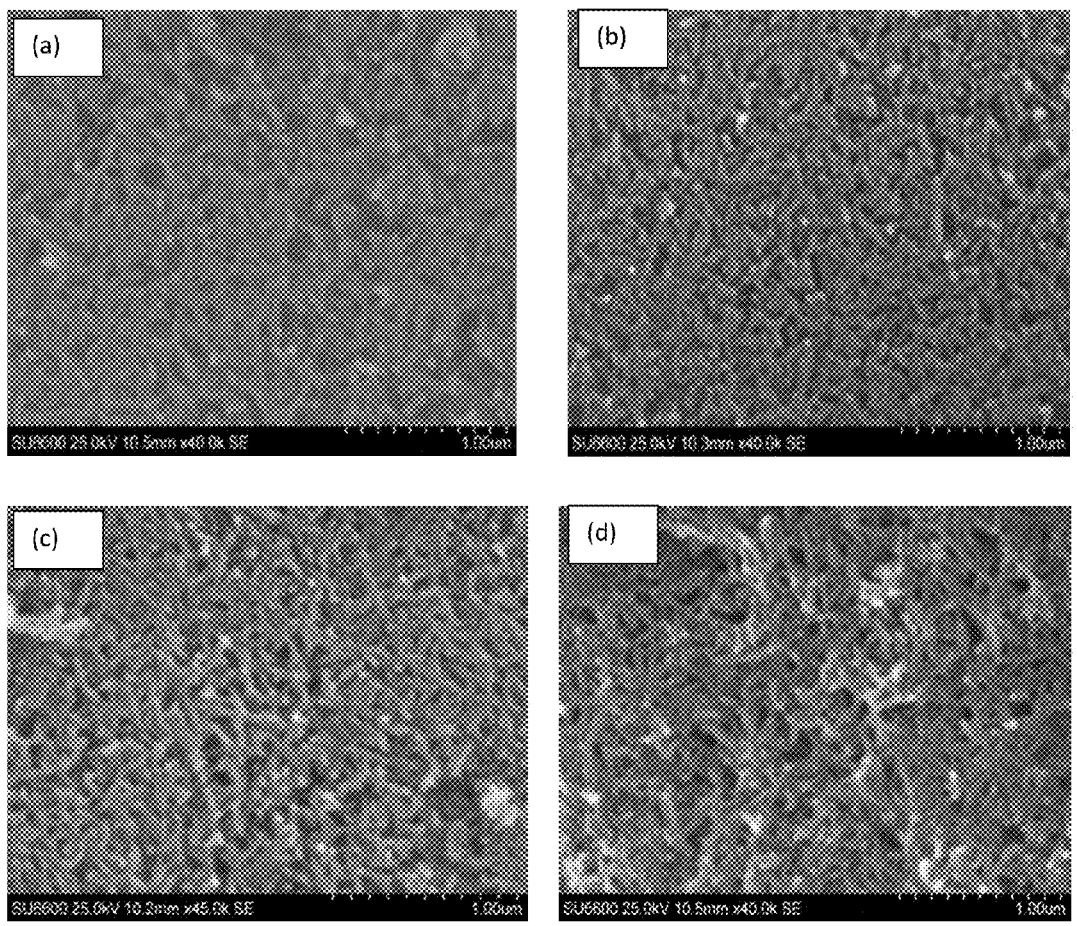
Figure 8: SEM images of HAP nanoparticles formed at different pH values (a) 5, (b) 7, (c) 9 and (d) 11.

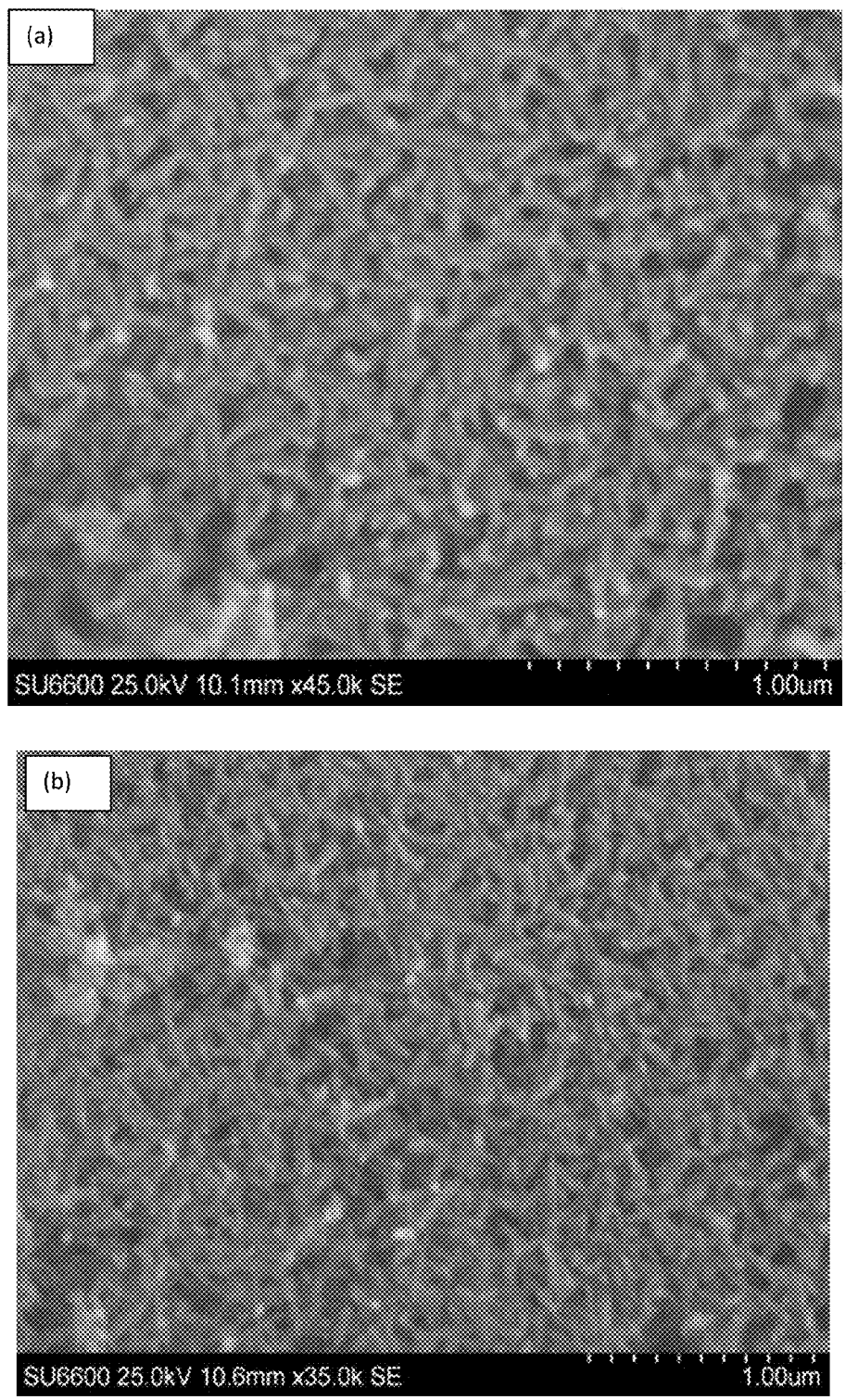
Figure 9: SEM images of HAP nanoparticles prepared by (a) drop wise addition and (b) spray addition method.

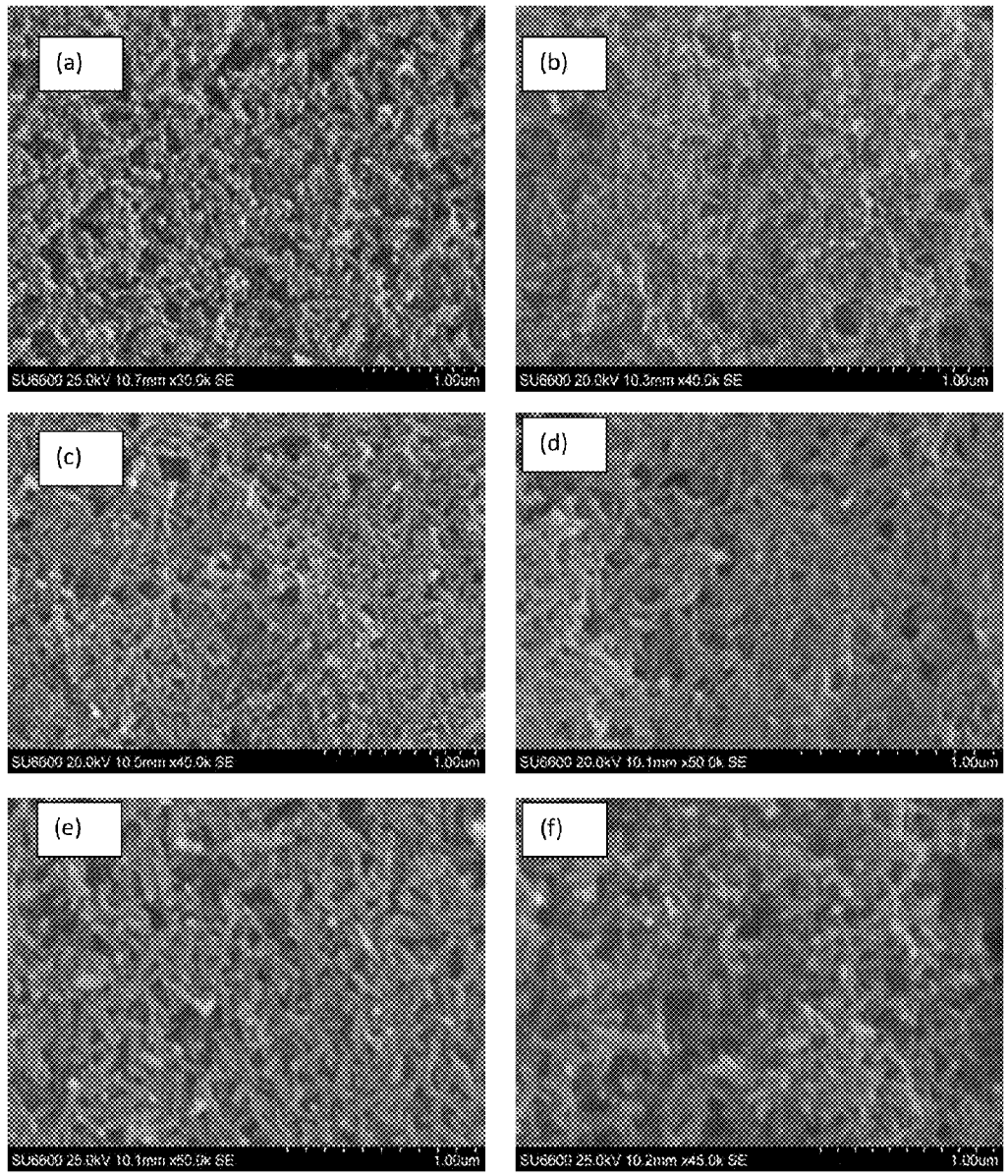
Figure 10: SEM images of HAP nanoparticles prepared with different stirring speeds, (a) 100, (b) 200, (c) 300, (d) 400, (e) 600 and (f) 800 rpm.

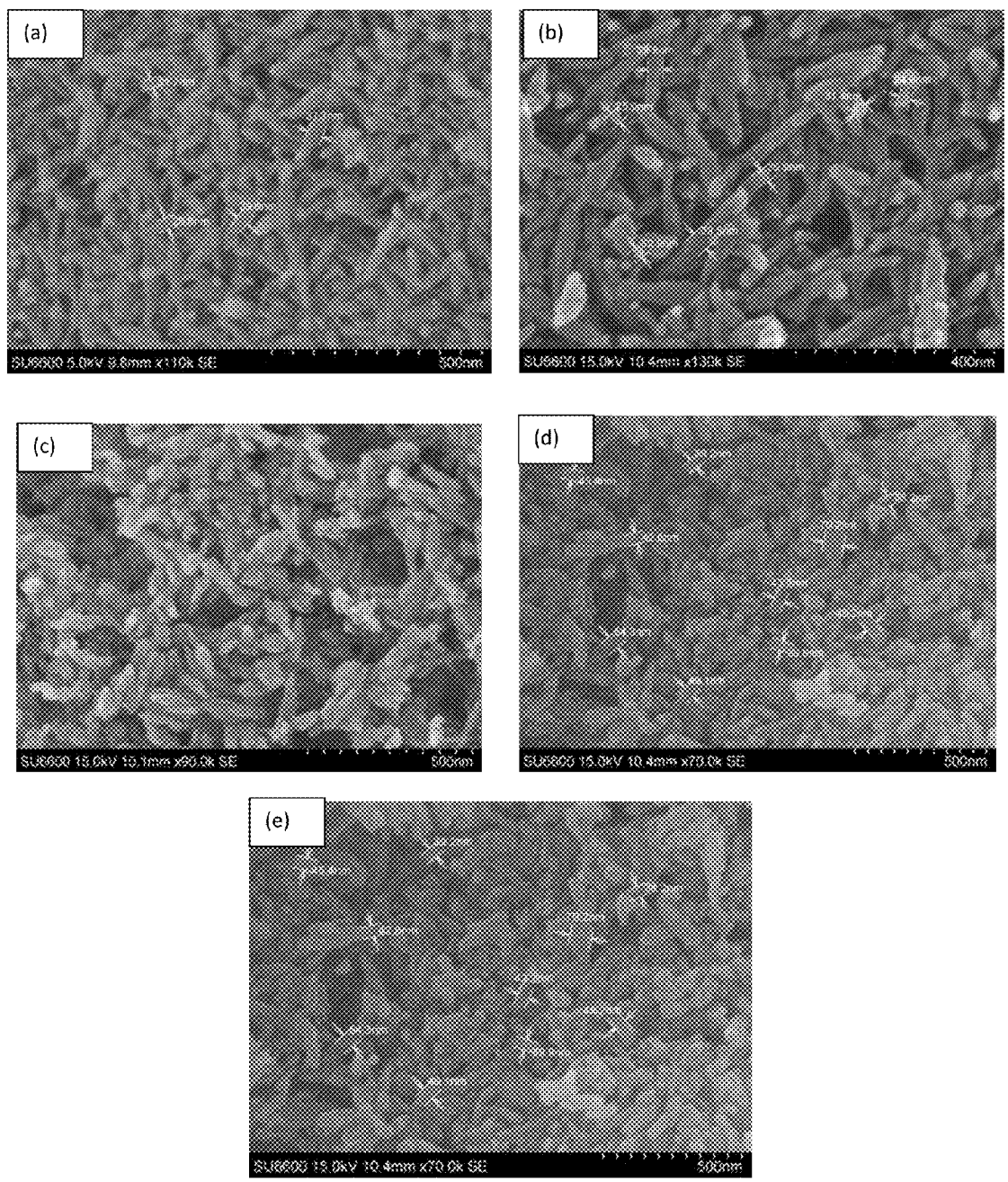
Figure 11: SEM images of HAP nanoparticles prepared at different reaction temperatures (a) 10 °C, (b) 25 °C, (c) 70 °C, (d) 85 °C and (e) 100 °C.

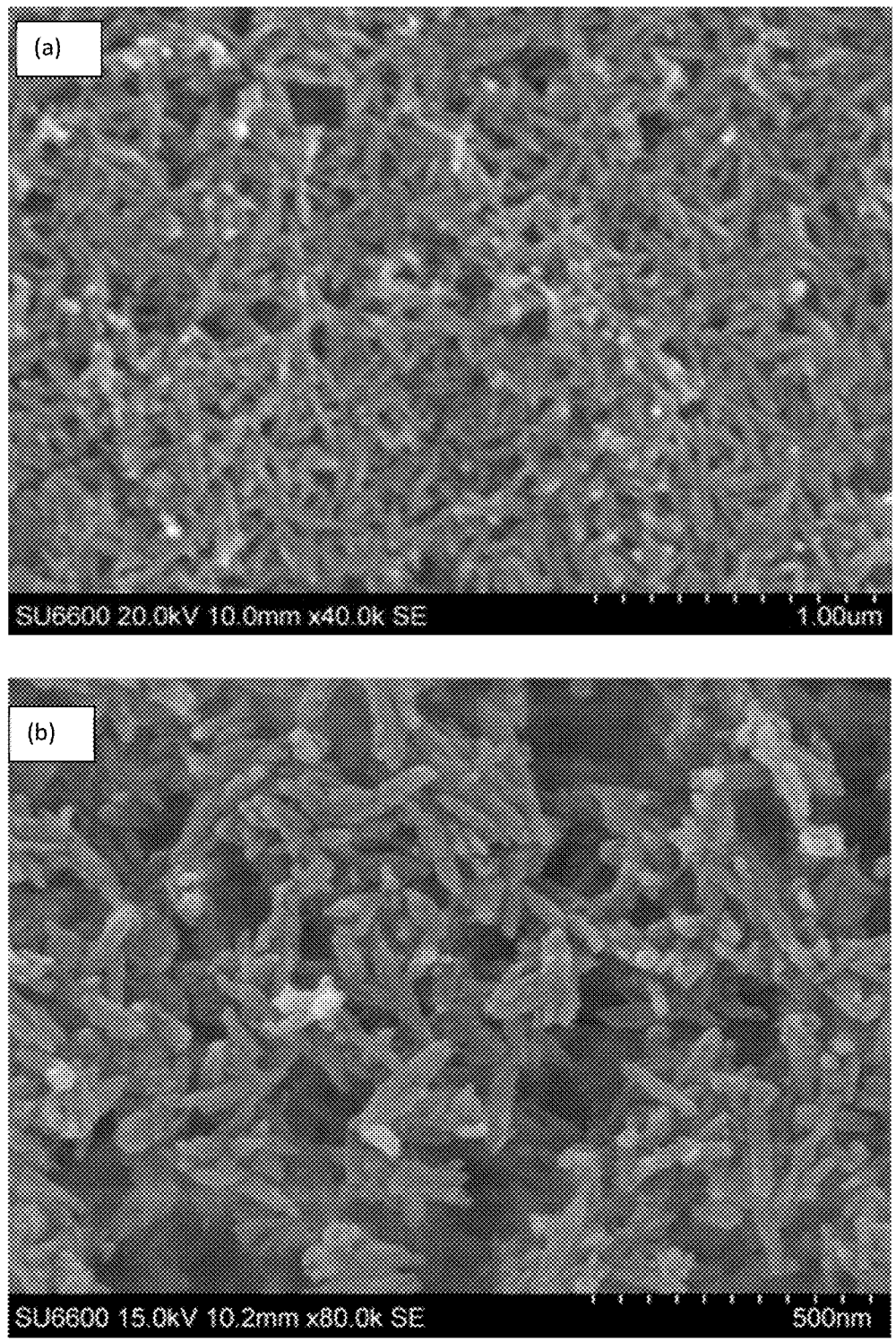
Figure 12: SEM images of the HAP nanoparticles prepared using (a) 0.6 M and (b) conc. phosphoric acid.

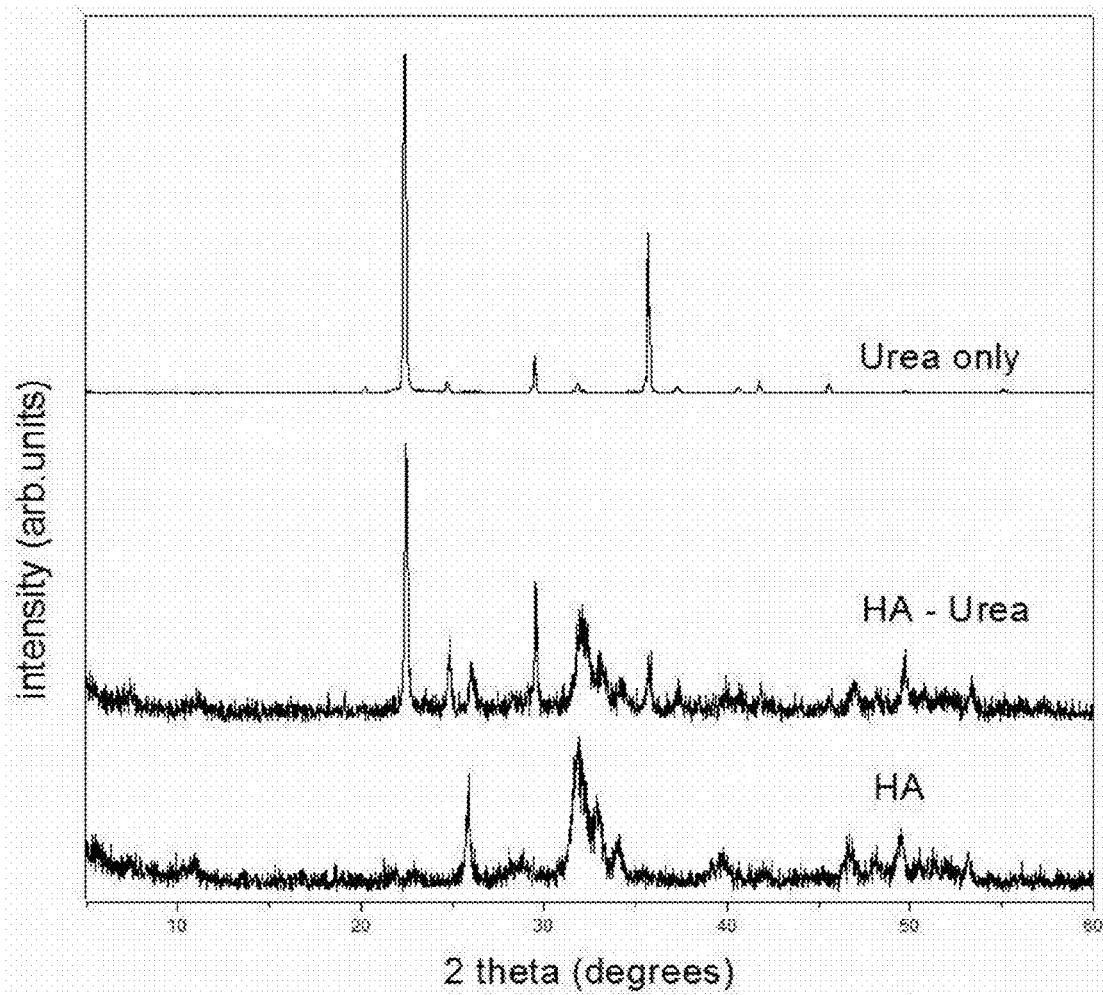
Figure 13: PXRD patterns for Urea, an embodiment of the present Urea-HAP nanoparticle composite invention, and HAP nanoparticles.

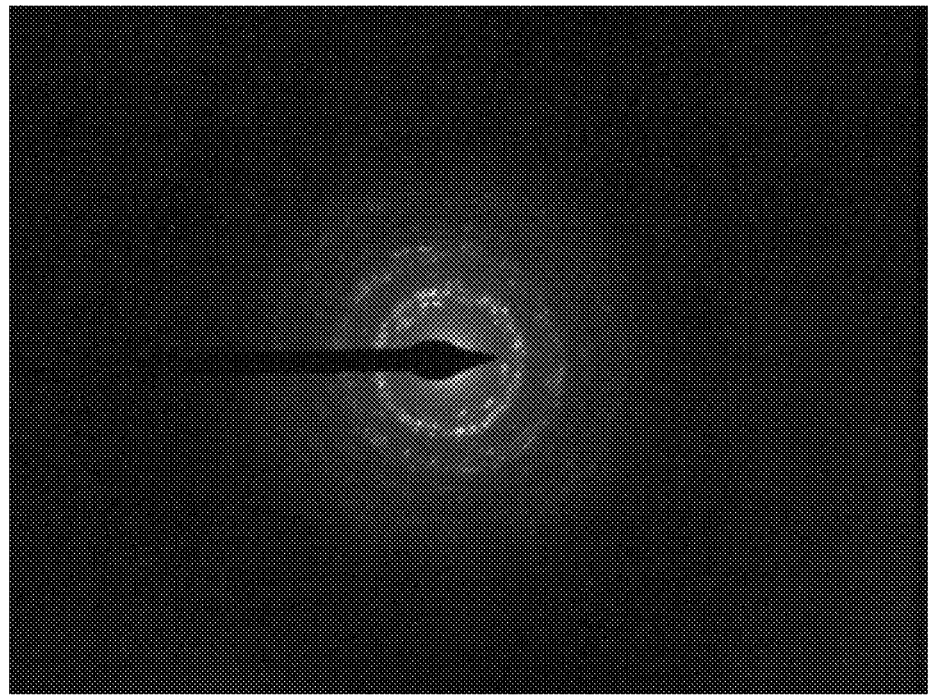
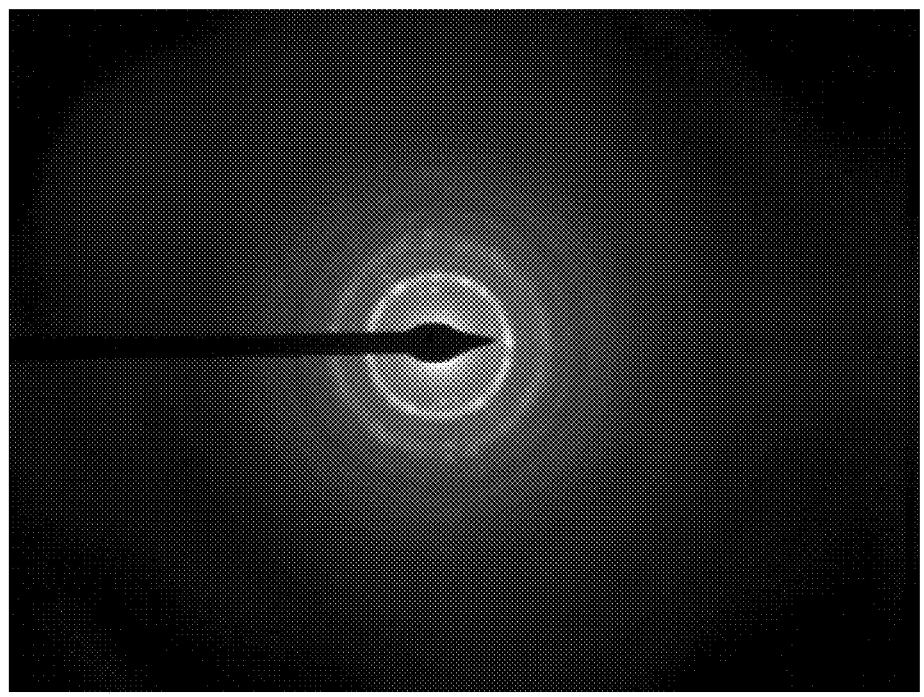
Figure 14: Electron diffraction patterns of (a) HAP nanoparticles and (b) an embodiment of the present Urea-HAP nanoparticle composite invention.

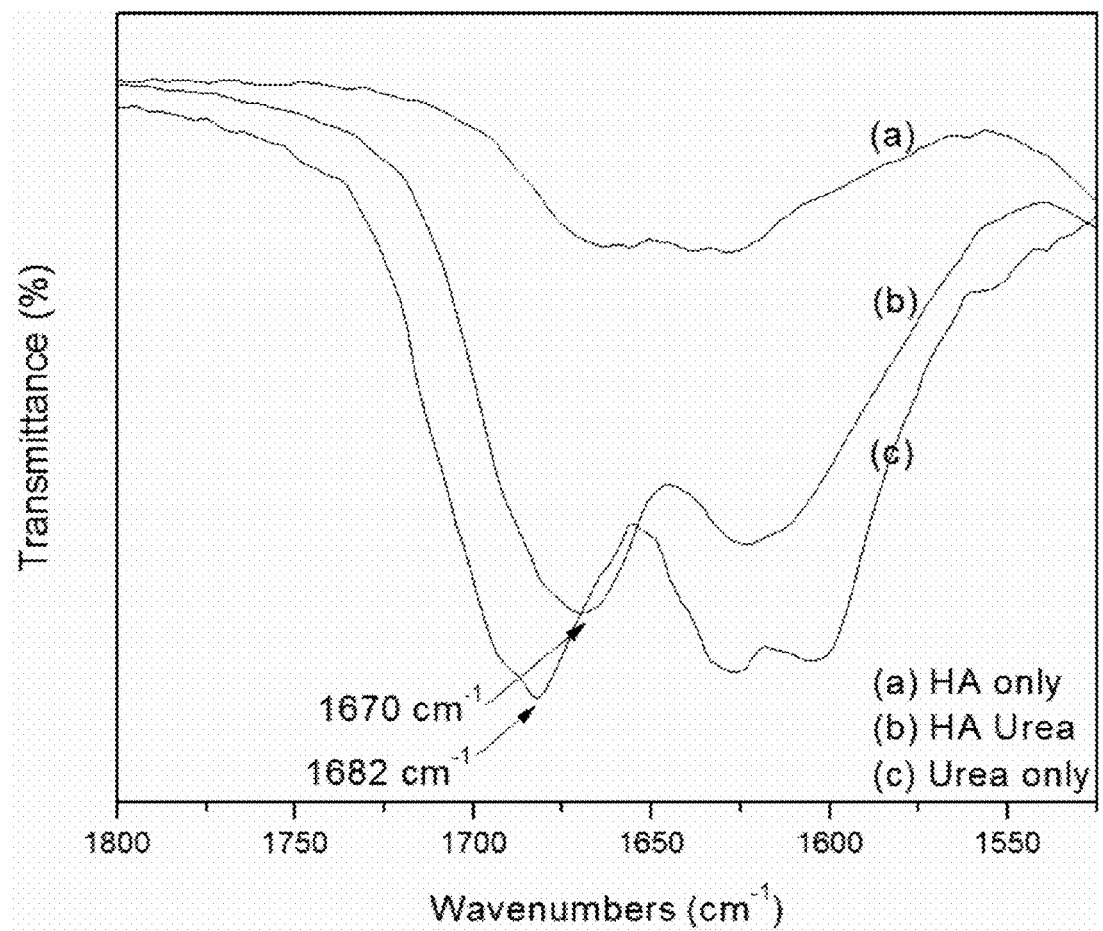
Figure 15: FTIR spectrum for the carbonyl stretching region of (a) HAP nanoparticles (b) an embodiment of the present Urea-HAP nanoparticle composite invention and (c) Urea.

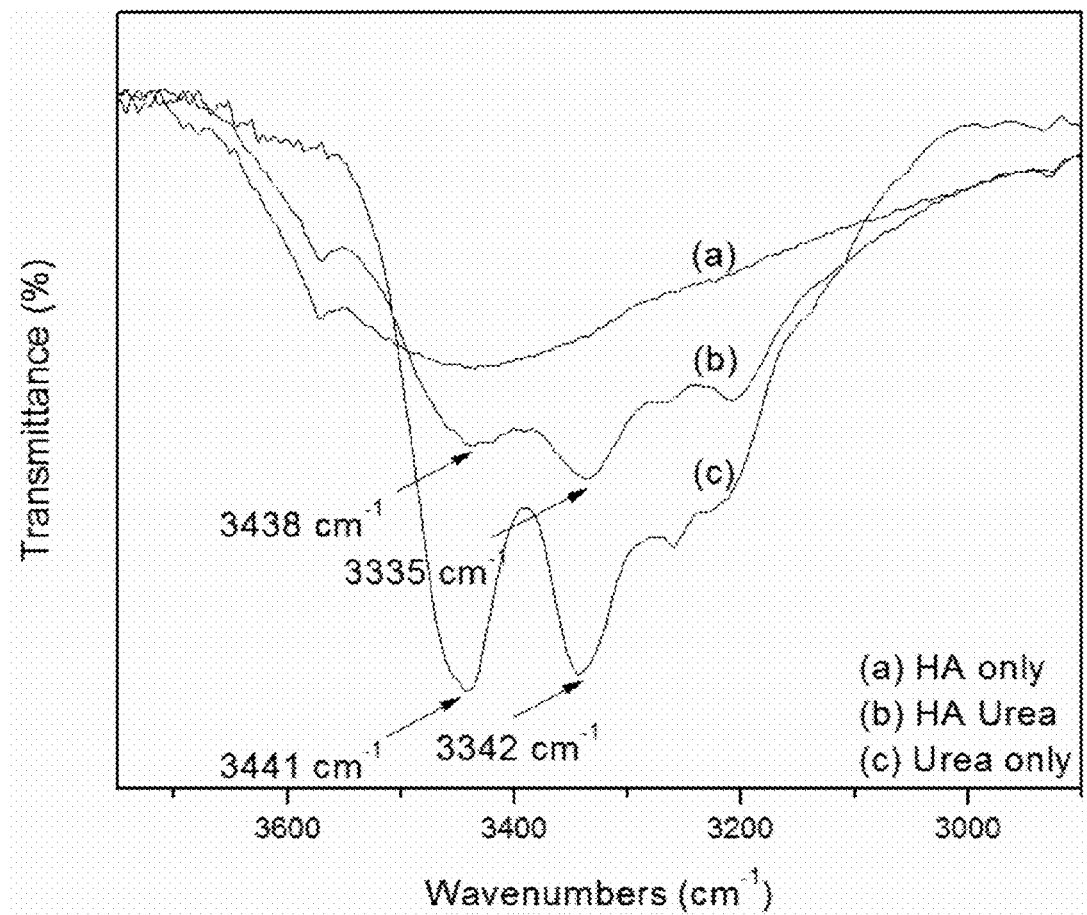
Figure 16: FTIR spectrum for the amine stretching region of (a) HAP nanoparticles (b) an embodiment of the present Urea-HAP nanoparticle composite invention and (c) Urea.

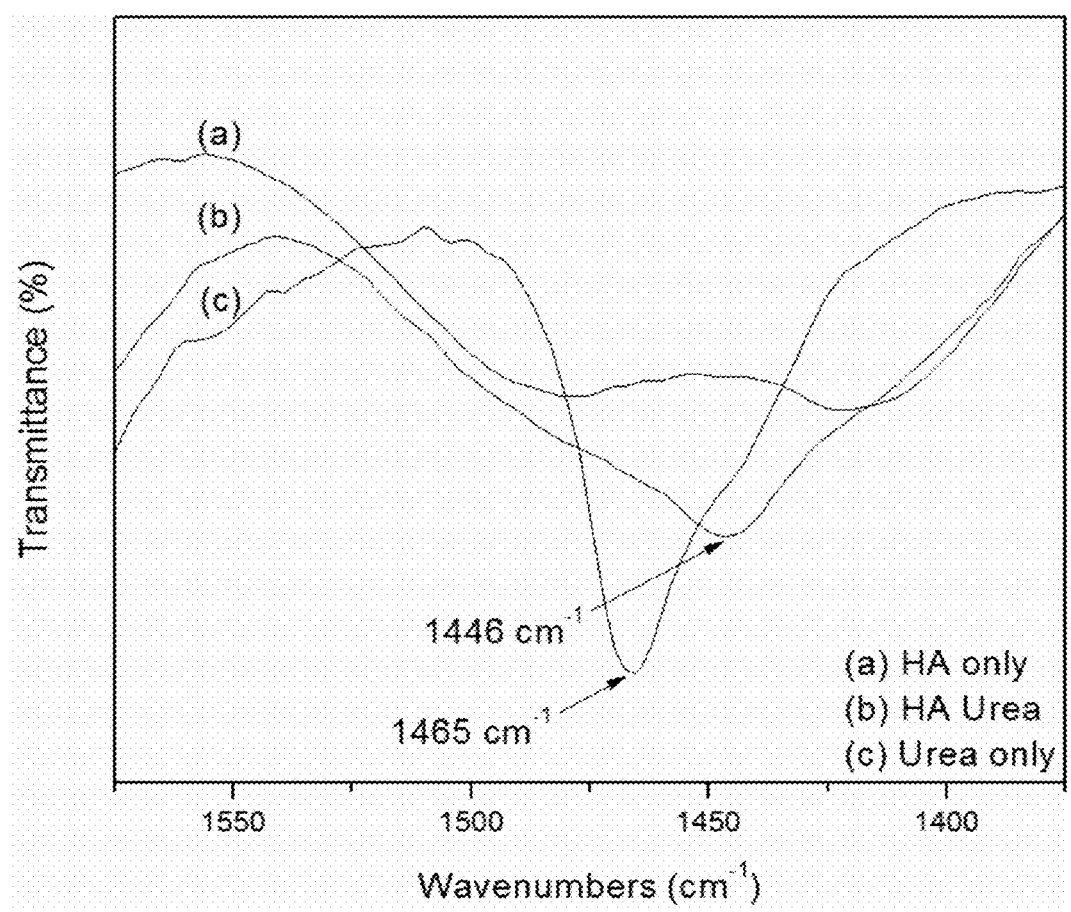
Figure 17: FTIR spectrum for the N-C-N stretching region of (a) HAP nanoparticles (b) an embodiment of the present Urea-HAP nanoparticle composite invention and (c) Urea.

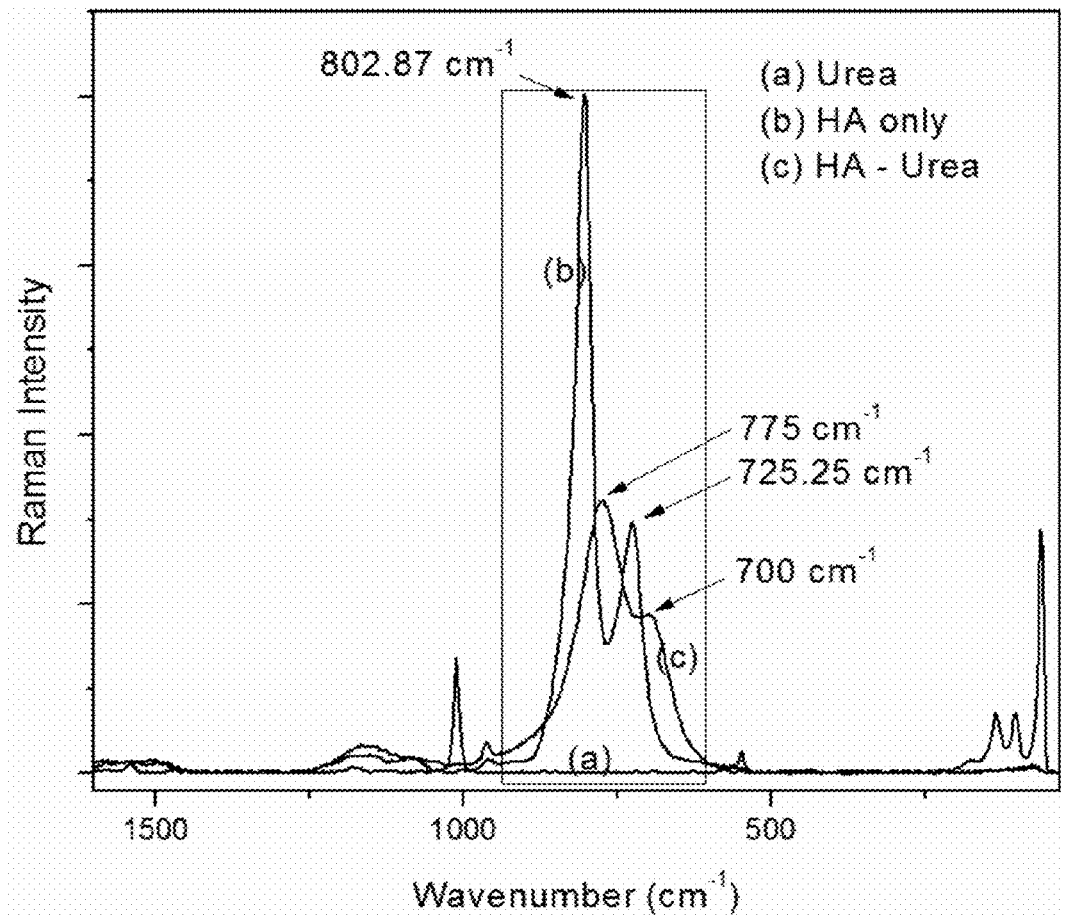
Figure 18: Raman Spectra of (a) Urea, (b) HAP nanoparticles and (c) an embodiment of the Urea-HAP nanocomposite of the present invention.

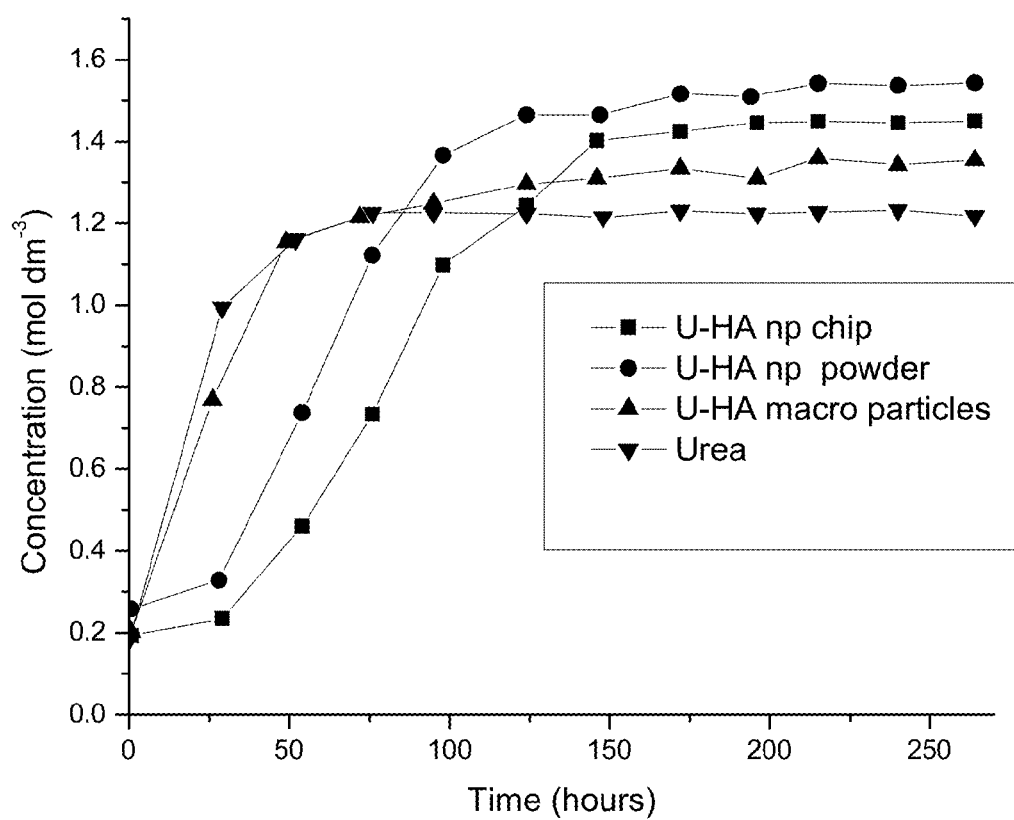
Figure 19: Release behavior comparison for Urea, Urea-HAP nanoparticle chip, Urea-HAP nanoparticle powder and Urea and HAP macroparticles in water.

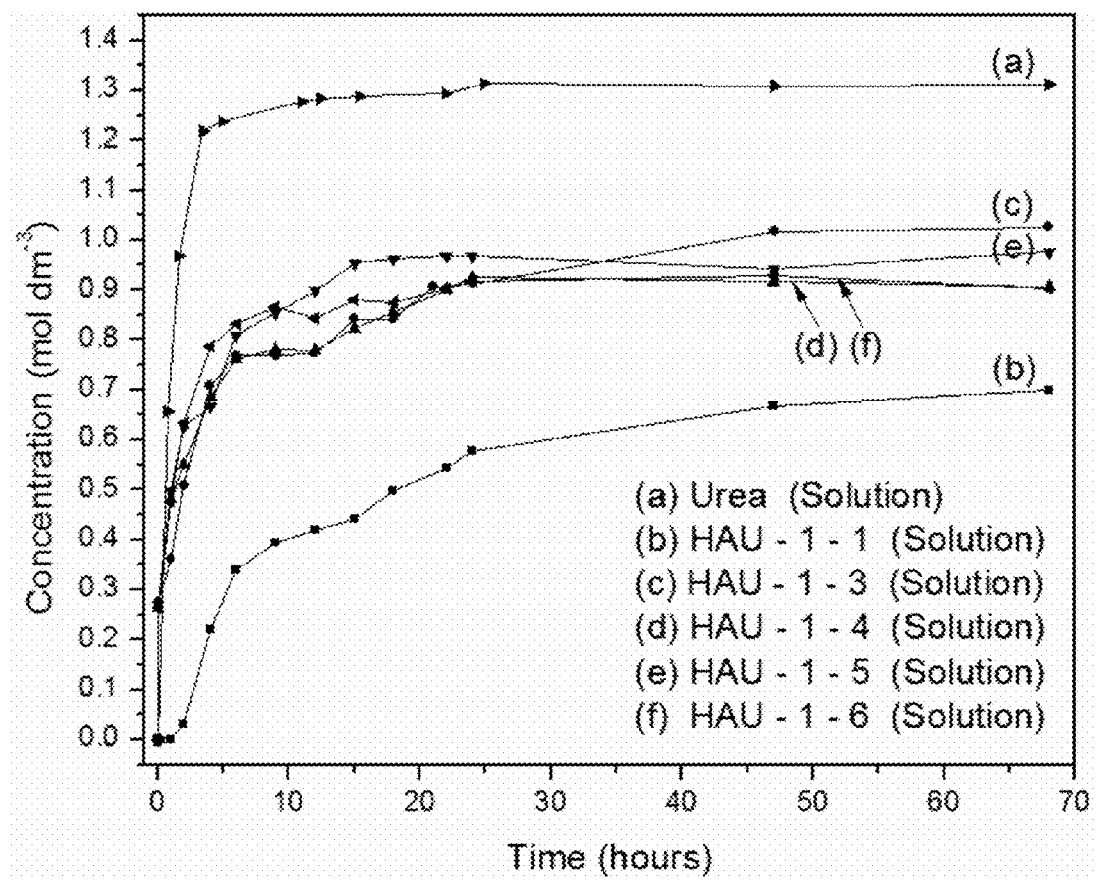
Figure 20: Release behavior comparison in water for (a) Urea, embodiment of the present Urea-HAP nanoparticle composite invention with HAP :Urea (b) 1:1, (c) 1:3, (d) 1:4, (e) 1:5 and (f) 1:6 in liquid phase.

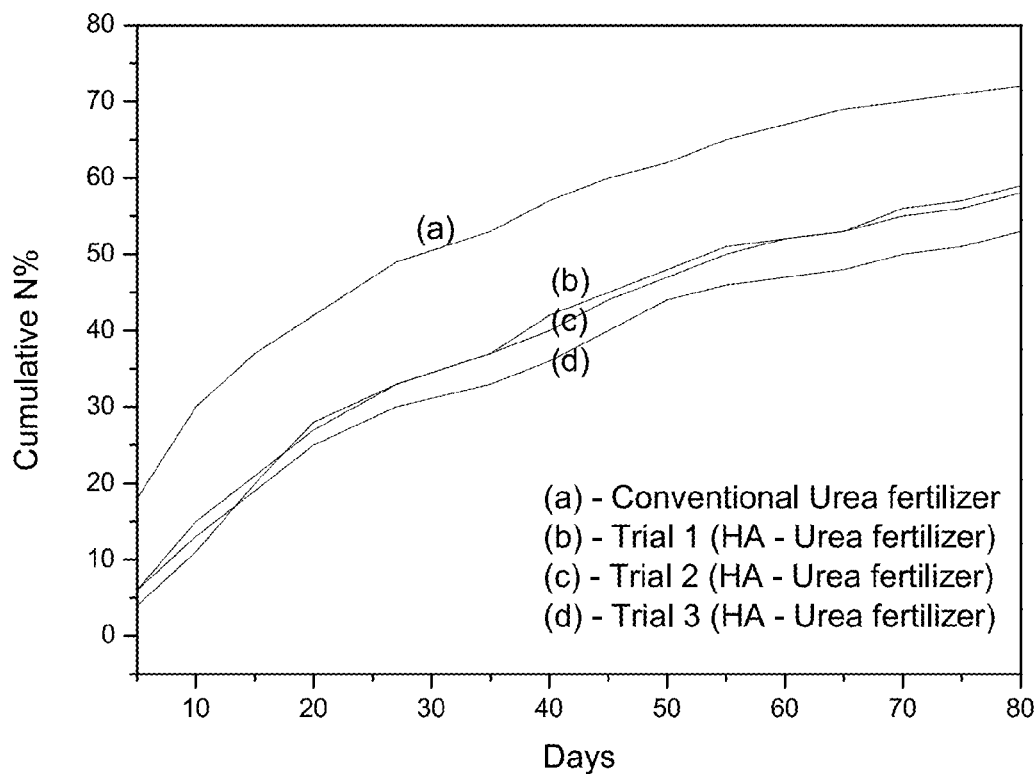
Figure 21: Release behavior comparison for Urea, Urea-HAP nanoparticle chip in soil.

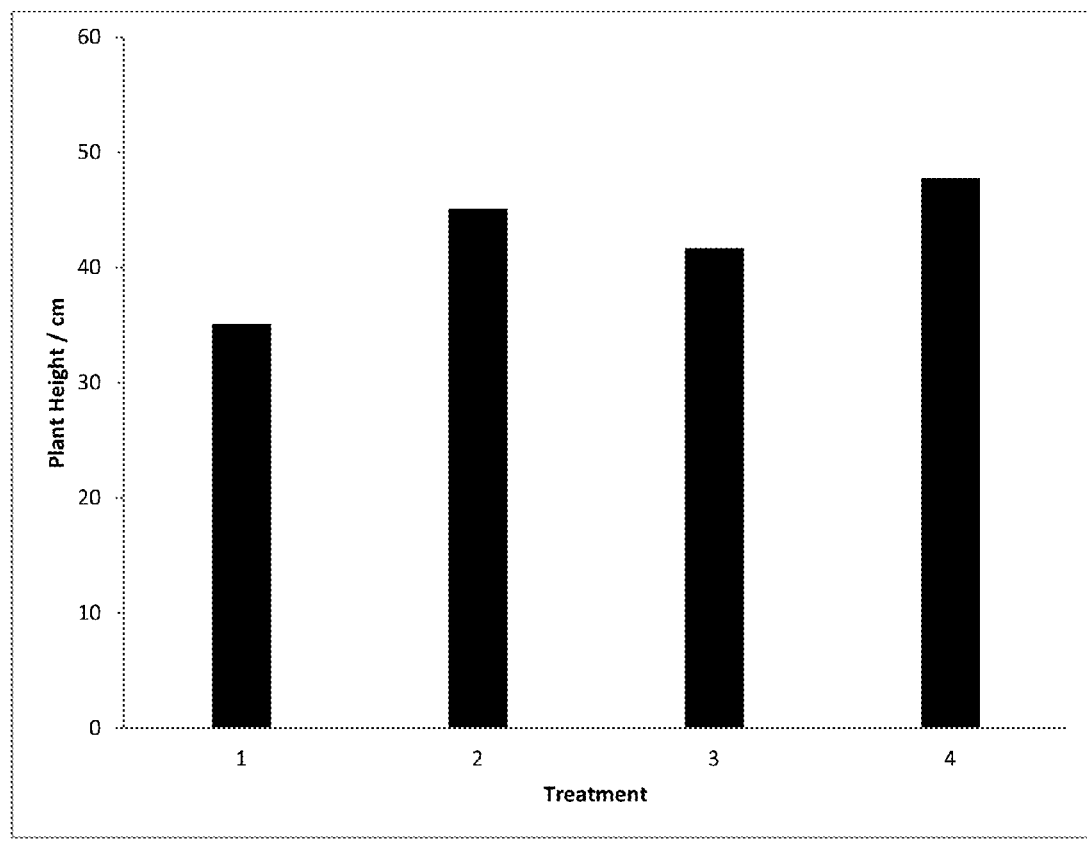
Figure 22: Rice plant height/cm vs. treatments 1-4.

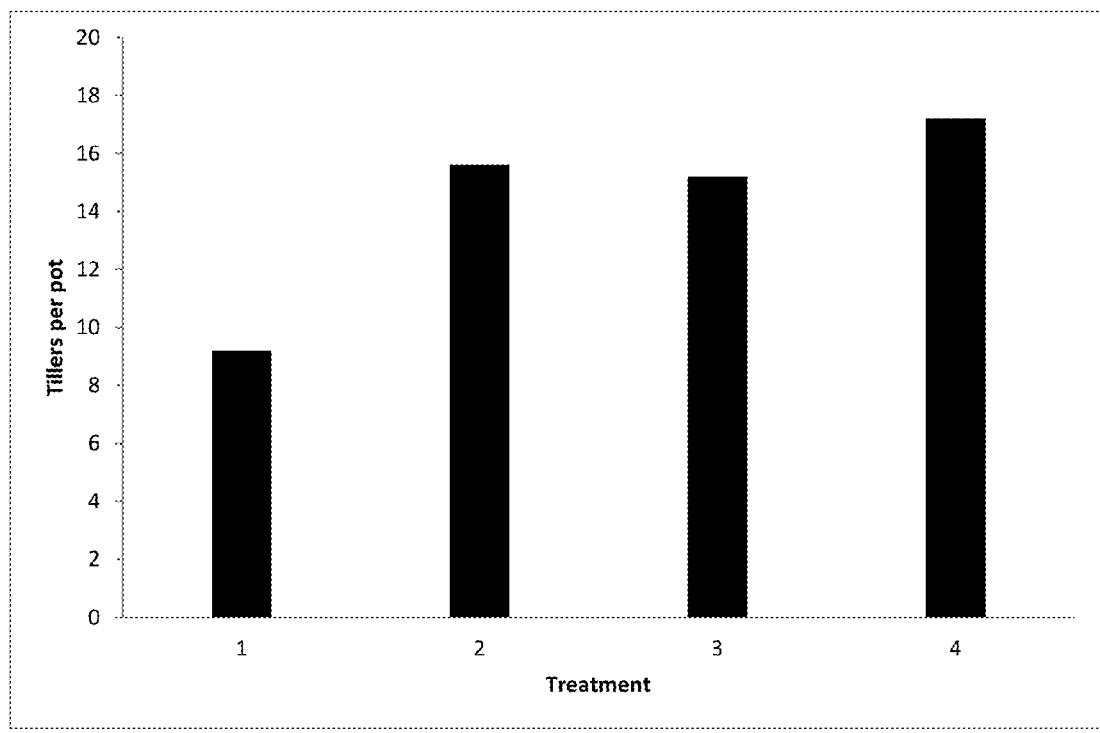
Figure 23: Number of tillers per pot vs. treatments 1-4.

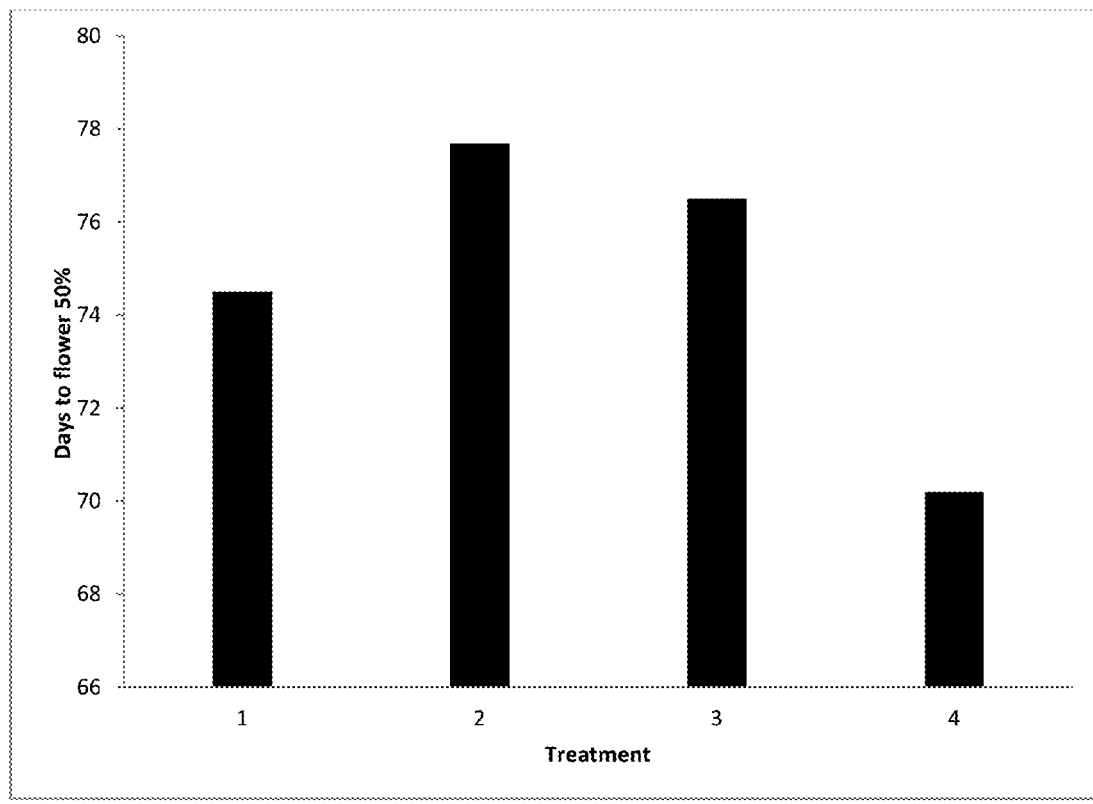
Figure 24: Number of days to flower vs. treatments 1-4.

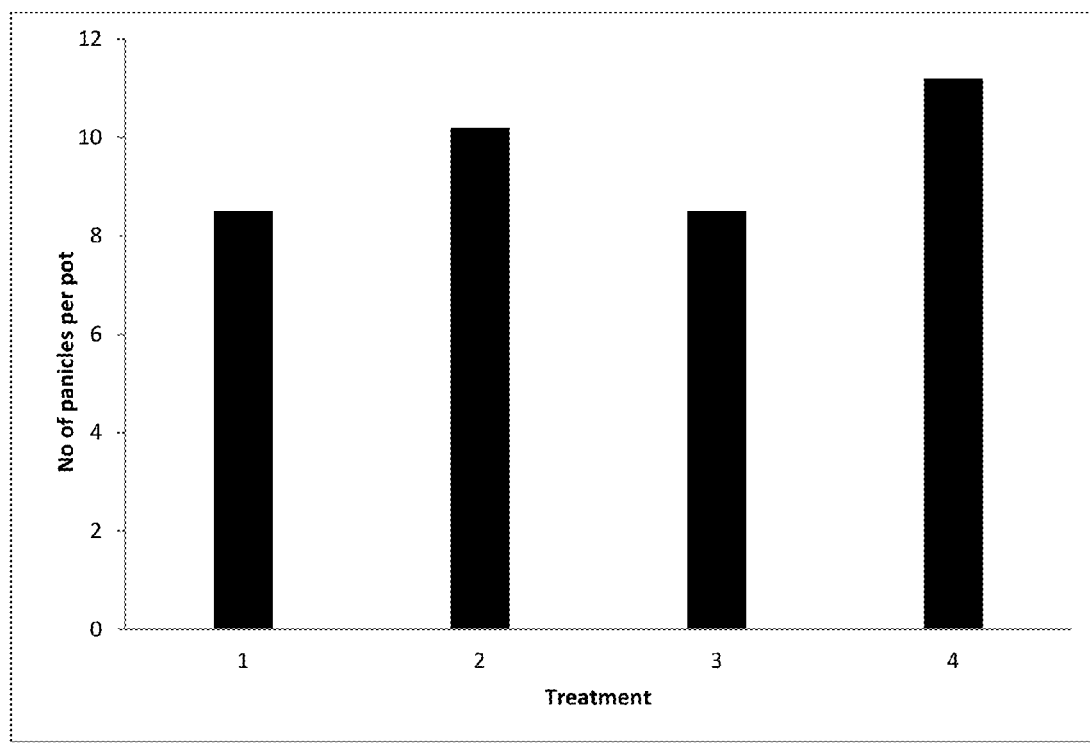
Figure 25: Number of panicles per pot vs. treatments 1-4.

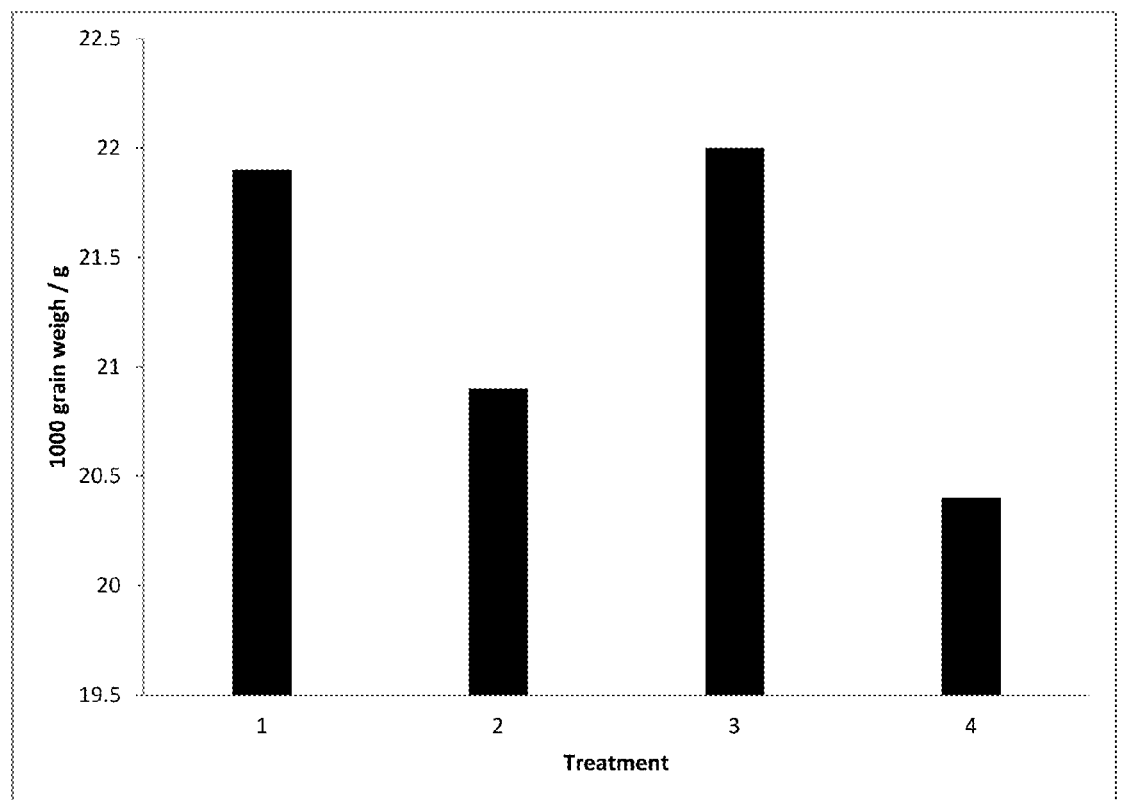
Figure 26: 1000 grain weight/g vs. treatments 1-4.

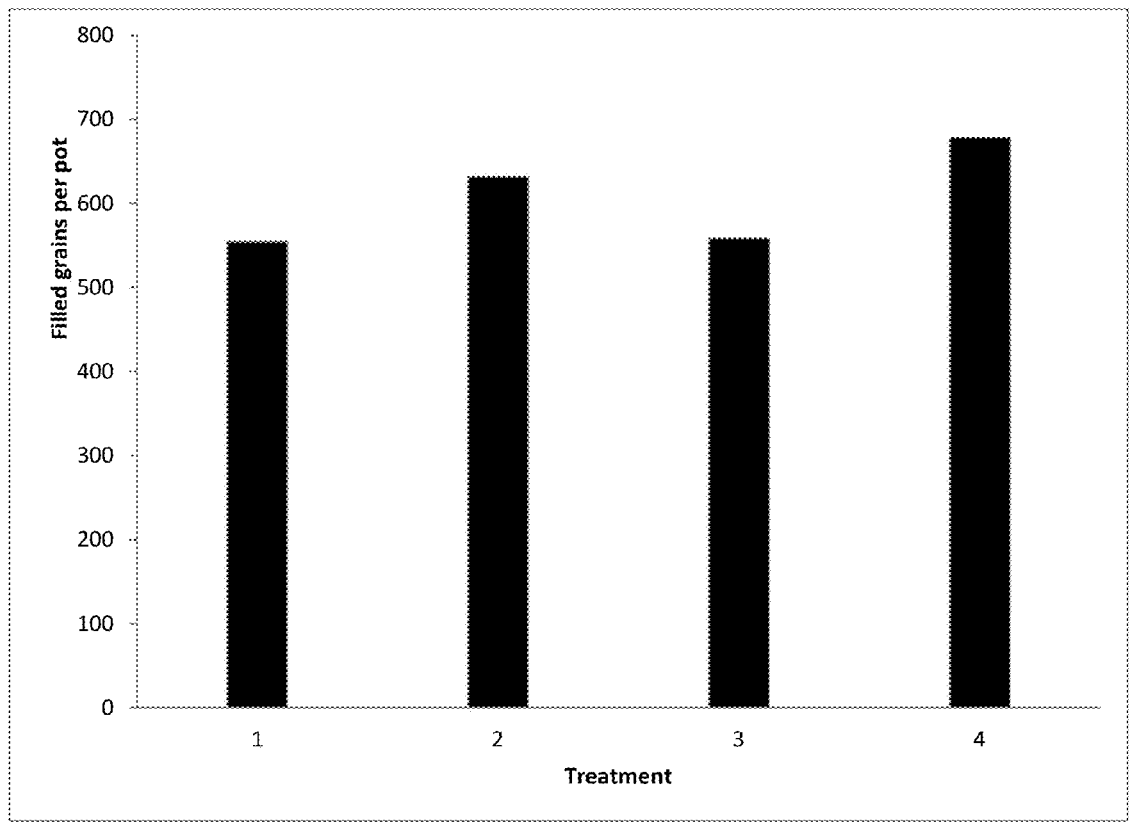
Figure 27: Number of filled grains per pot vs. treatments 1-4.

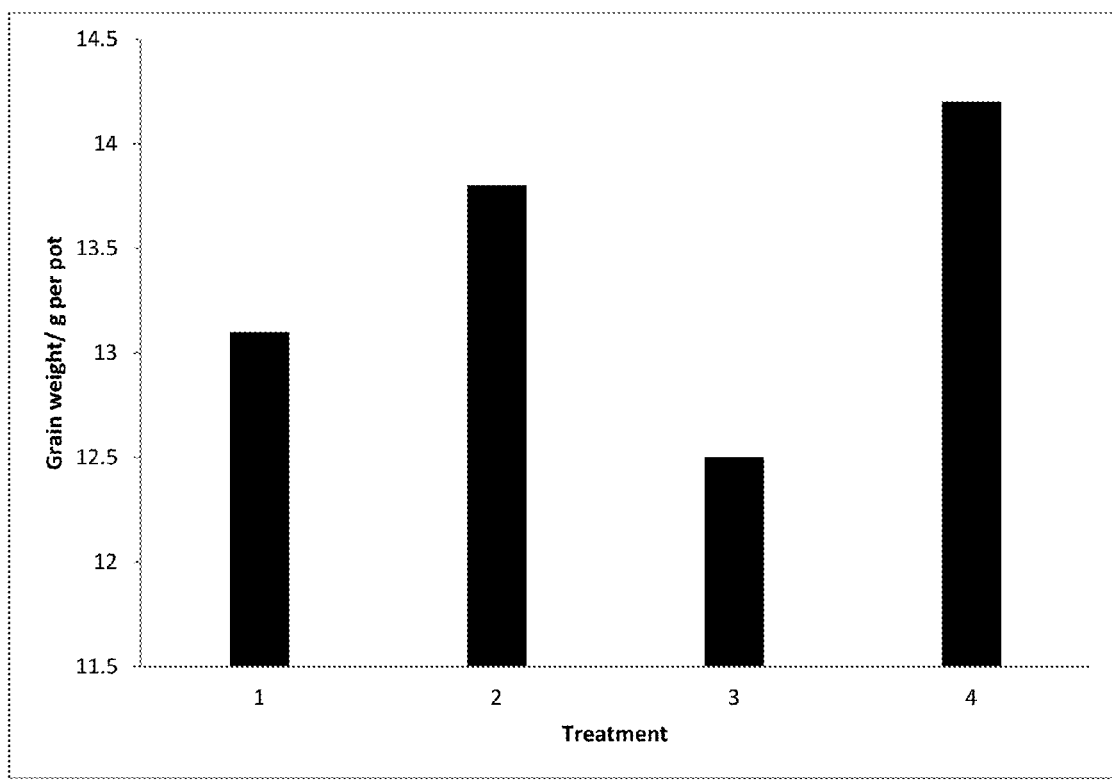
Figure 28: Grain weight/g per pot vs. treatments 1-4.

COMPOSITION AND METHOD FOR SUSTAINED RELEASE OF AGRICULTURAL MACRONUTRIENTS

CROSS-REFERENCE TO RELATED APPLICATIONS

This application is a continuation-in-part of U.S. application Ser. No. 12/794,741 filed Jun. 5, 2010 now U.S. Pat. No. 8,361,185, which is hereby incorporated herein in its entirety by reference.

FIELD OF THE INVENTION

This invention relates to a composition for and a method of providing sustained release of agricultural nutrients. More particularly this invention relates to nitrogen containing macronutrient adsorbed hydroxyapatite phosphate (HAP) nanoparticles and a method of using nitrogen containing macronutrient adsorbed hydroxyapatite phosphate nanoparticles as a slow-release fertilizer.

BACKGROUND

Commercial fertilizers contain macronutrients and micronutrients that are essential for plant growth and macronutrients are used by plants in relatively large amounts. As defined herein primary macronutrients are nitrogen (N), phosphorous (P) and potassium (K) while calcium (Ca), magnesium (Mg) and sulfur (S) are secondary macronutrients. All six nutrients are important for plant growth.

As defined herein, micronutrients required in small amounts for plant growth are boron (B), chlorine (Cl), manganese (Mn), iron (Fe), zinc (Zn), copper (Cu), molybdenum (Mo) and selenium (Se).

Nitrogen, phosphorus and potassium (NPK), which are required in large amounts for plants, are not always adequately available in natural soils to support the sustained growth of plants. Therefore, these macronutrients (NPK) are often needed to be applied externally through fertilizer. Water soluble conventional fertilizers typically result in a large amount of macronutrients being lost by leaching and evaporation. Thus, there is an increased interest in developing slow release fertilizers that release macronutrients to plants over time.

Advantages of slow release fertilizers are improved efficiency and quality as the fertilizer is released over time, thus providing sufficient quantities of macronutrients as required for higher crop yields. In addition, slow release fertilizers result in reduced environmental damage from leaching of macronutrients into water and emissions as gasses, compared to conventional water soluble fertilizers.

Macronutrients in fertilizers can be applied to the soil as a solid in the form of a powder or pellets or as a spray. The uptake of macronutrients by the plant needs to be compensated by their external application to the soil periodically. Nitrogen is a key macronutrient source in agriculture particularly for economic crops such as tea. For example, large amount of fertilizer is applied to the soil of the tea plant to improve the quality and the yield of the leaves produced. A study in Japan (Yamada et al., Journal of Water and Environmental Technology, 7, 4, 331-340, 2009) reported that of the large amount of nitrogen fertilizer applied to tea, only 12% of the nitrogen input was taken up by the plant and the rest discharged to the environment. Therefore, one of the unsolved problems of fertilizer application is, in relation to the amounts of nitrogen applied to soil, the low Nitrogen Use Efficiency (NUE) by crops. This is because an excessive amount of nitrogen, up to 70%, is lost when using conventional fertilizers due to leaching, emissions and long-term incorporation by soil microorganisms. As such, supplying nitrogen macronutrient is critical in preventing the decline of productivity and profitability due to degradation and aging of tea plants (Kamau et al., Field Crops Research 1, 108, 60-70, 2008). Attempts to increase the NUE have so far has met with little success.

U.S. Pat. No. 6,261,997 B1 to Rubin et al. discloses slow release of pesticides adsorbed on organically modified clay to prevent leaching in underground and surface water. U.S. Pat. No. 4,219,349 to Bardsley discloses compositions of calcined clay granules and solution or suspension containing micronutrients (Fe, Zn, Mn, Cu, B, Mo, Cl and S). U.S. Pat. No. 4,849,006 to Milburn et al. discloses a controlled release composition comprising of an organic, biologically active material absorbed on an organically modified clay. U.S. Pat. No. 6,821,928 B2 to Ruskin discloses a method to reduce the rate of diffusion of slow release materials through polymers and a process for making drip irrigation devices with long term control of root growth. It further, discloses bioactive material such as herbicide that is intercalated into nanoclays to protect against root intrusion in drip irrigation applications. U.S. Pat. No. 3,902,886 to Banin et al. discloses clay attached micronutrients to provide micronutrients to plants. US2009/0169524 A1 to Kalpana et al. discloses biopolymer based nanocomposites of chitosan, montmorillonite (MMT) and hydroxyapatite for bone growth in medical applications.

Solutions are needed to provide slow release macronutrient formulations for plant growth applications.

SUMMARY

A nitrogen containing macronutrient is adsorbed on HAP nanoparticles and used as a fertilizer. The macronutrient adsorbed HAP nanoparticles disclosed herein, when applied to aqueous and terrestrial environments, slowly release the macronutrient to the soil. The soil medium acts as a conduit for providing the transport of the macronutrients such as urea to the roots of the plant.

BRIEF DESCRIPTION OF FIGURES

FIG. 1: SEM images of an embodiment of the present invention showing the urea adsorbed HAP nanoparticles prepared by template method (a) as synthesized and (b) after 2 hrs of synthesis, resulting as a solid chip, showing nanobeads and bead-chain-like structures obtained by the directional growth of nanobeads, respectively.

FIG. 2: SEM images of an embodiment of the present invention where showing the urea adsorbed HAP nanoparticles foliage formulations prepared with HAP:Urea (a) 1:1, (b) 1:3, (c) 1:4, (d) 1:5 and (e) 1:6.

FIG. 3: TEM images of an embodiment of the present invention showing (a) synthesized HAP nanoparticles and (b) urea adsorbed HAP nanoparticles.

FIG. 4: SEM image of an embodiment of the present invention showing the bead-chain-like structure of the HAP-urea nanoparticles formed by the Sol-Gel method.

FIG. 5: Crystallographic representation of HAP nanoparticles.

FIG. 6: Schematic representation of the directional growth of nanobead like nanoparticles into bead-chain-like particles.

FIG. 7: SEM images of HAP nanoparticles formed with different addition rates of phosphoric acid, (a) 250 ml min$^{-1}$, (b) 70 ml min$^{-1}$, (c) 20 ml min$^{-1}$ and (d) 6 ml min$^{-1}$.

FIG. 8: SEM images of HAP nanoparticles formed at different pH values (a) 5, (b) 7, (c) 9 and (d) 11.

FIG. 9: SEM images of HAP nanoparticles prepared by (a) drop wise addition and (b) spray addition methods.

FIG. 10: SEM images of HAP nanoparticles prepared with different stirring speeds, (a) 100, (b) 200, (c) 300, (d) 400, (e) 600 and (f) 800 rpm.

FIG. 11: SEM images of HAP nanoparticles prepared at different reaction temperatures (a) 10° C., (b) 25° C., (c) 70° C., (d) 85° C. and (e) 100° C.

FIG. 12: SEM images of the HAP nanoparticles prepared using (a) 0.6 M and (b) conc. phosphoric acid.

FIG. 13: PXRD patterns for Urea, an embodiment of the present Urea-HAP nanoparticle composite invention and HAP nanoparticles.

FIG. 14: Electron diffraction patterns of (a) HAP nanoparticles and (b) an embodiment of the present Urea-HAP nanoparticle composite invention.

FIG. 15: FTIR spectra for the carbonyl stretching region of (a) HAP nanoparticles (b) an embodiment of the present Urea-HAP nanoparticle composite invention and (c) Urea.

FIG. 16: FTIR spectra for the amine stretching region of (a) HAP nanoparticles (b) an embodiment of the present Urea-HAP nanoparticle composite invention and (c) Urea.

FIG. 17: FTIR spectra for the N—C—N stretching region of (a) HAP nanoparticles (b) an embodiment of the present Urea-HAP nanoparticle composite invention and (c) Urea.

FIG. 18: Raman spectra of (a) Urea, (b) HAP nanoparticles and (c) an embodiment of the Urea-HAP nanocomposite of the present invention.

FIG. 19: Release behavior comparison for Urea, Urea-HAP nanoparticle chip, Urea-HAP nanoparticle powder and Urea and HAP macroparticles in water.

FIG. 20: Release behavior comparison in water for (a) Urea; embodiment of the present Urea-HAP nanoparticle composite invention with HAP:Urea (b) 1:1, (c) 1:3, (d) 1:4, (e) 1:5 and (f) 1:6 in liquid phase.

FIG. 21: Release behavior comparison for Urea and embodiments of the present Urea-HAP nanoparticle chip invention, in soil.

FIG. 22: Rice plant height/cm vs. treatments 1-4.

FIG. 23: Number of tillers per pot vs. treatments 1-4.

FIG. 24: Number of days to flower vs. treatments 1-4.

FIG. 25: Number of panicles per pot vs. treatments 1-4.

FIG. 26: 1000 grain weight/g vs. treatments 1-4.

FIG. 27: Number of filled grains per pot vs. treatments 1-4.

FIG. 28: Grain weight/g per pot vs. treatments 1-4.

DETAILED DESCRIPTION

As defined herein, slow release of macronutrients provides the plant with nutrients gradually over an extended period of time. As described herein in further detail, such an extended period of time can be up to three months. Soils applied with slow release fertilizer that contain macronutrients will require fewer applications of such fertilizer. Use of a slow release fertilizer leads to higher efficiency of macronutrient release compared to conventional fast release fertilizers.

Adsorption, as defined herein, refers to any means that forms a complex between the nitrogen containing macronutrient compound and the hydroxyapatite phosphate ("HAP" or "HA") nanoparticles. These include covalent bonds, electrostatic bonds, Van der Waals bonds and hydrogen bonds.

Any other nitrogen containing substance which can deliver nitrate or nitrite to the plant can be used as the macronutrient for adsorption onto the HAP nanoparticles. Examples of such nitrogen containing substances include, but are not limited to, urea, thiourea, amides, polyamines, ammonia and alginates.

Overview of Manufacture and Morphology of HAP Nanoparticle—Nitrogen Containing Macronutrient Composite HAP nanoparticles can be chemically synthesized using calcium hydroxide suspension and phosphoric acid (Mateus et al., Key Engineering Materials, 330-332, 243-246, 2007). A more detailed description of the synthesis of HAP nanoparticles is described herein.

Structural morphology of the HAP-nanoparticles described herein indicates an initial formation of bead-like HAP nanoparticles that grow into a bead-chain-like structures. This growth pattern suggests that one face of the bead-like HAP nanoparticle is possibly crystallized with a hexagonal unit cell and is highly energetic thus leading to a directional growth along one orientation. This directional growth may occur through the $PO_4^{2-}$ terminating plane. (See FIGS. 5 and 6). This results in a nanobead-chain-like structure leading to rod-like morphology. The directional growth is interrupted or delayed in the presence of spacer molecules such as amines and amides in the medium because $Ca^{2+}$ may complex with the nitrogen donor.

Methods for adsorption of nitrogen containing macronutrient compounds such as urea on the HAP nanoparticles are also described herein.

SEM imaging indictes particle size of less than 30 nm for a preferred embodiment of macronutrient adsorbed HAP nanoparticles. According to TEM imaging (see FIGS. 3*a* and 3*b*) a preferred embodiment of macronutrient adsorbed HAP nanoparticles displays rod-like morphology similar to the HAP nanoparticles prior to adsorption. FTIR and Raman indicate that, in a preferred embodiment of these nanoparticles, urea is attached to the hydroxyl terminating and $Ca^{2+}$ terminating faces of the HAP nanoparticles.

According to the methods described herein, prior to drying, HAP-nitrogen containing macronutrient nanoparticles can be obtained as a stable aqueous dispersion. After drying, the HAP-nitrogen containing macronutrient nanoparticles can be obtained as a white solid chips or granules. Furthermore, these chips or granules can be ground to provide a powder. This grinding preferably takes place using a roll mill or a ball mill. The aqueous dispersions, chips or granules can be used as slow release macronutrient formulations.

Release Behavior in Soils

The macronutrient-adsorbed HAP nanoparticles disclosed herein can be used for supplying macronutrients for crops such as tea; rubber; coconut; soybeans; cotton; tobacco; sugar cane; cereals such as rice, corn (maize), wheat, sorghum and wheat; fruits such as apples, oranges, tomatoes; vegetables; ornamental plants; and other short term cash crops that grow in a range of pH soils. Nitrogen-containing fertilizer is needed because production of crops removes nitrogen, which is essential for plant growth, from the soil. For example, the production of 1000 kg of tea leaves (dry weight) removes up to 100 kg of nitrogen from soil. This nitrogen has to be replenished by external application of fertilizer.

The nitrogen containing macronutrient adsorbed HAP nanoparticle composition described herein can be applied to the soil in the form of a powder, pellets, chips, a spray, or as an aqueous dispersion encapsulated within a biodegradable coating. In certain embodiments of the present invention, a slow release of nitrogen over a period up to three months is observed. During the fertilizing of tea plants, for example, the frequency of application can be attenuated depending on the fertilizer requirement of a given tea plantation. This can be done by starting a second round of application at a suitable period prior to reaching the end of the viability of the first application of the macronutrient adsorbed HAP nanoparticles. In another embodiment, multiple applications of the macronutrient-adsorbed HAP nanoparticles are distributed on soils within three months.

As a person skilled in the art may recognize, soil pH plays a role in the release behavior of the macronutrients from the macronutrient-adsorbed HAP nanoparticles to the soil. Further, soil pH is important in the growth of economic plants (Rice, Tea and Rubber) and ornamental plants (Ferns and Orchids). Generally, tea plants thrive in acidic soils in the pH range between about 4.2 to 5.7. However, rice is more tolerant of slightly higher pH the ideal range being between about 5.0-6.0. It is believed that high organic matter content in soil could lead to lowering of pH of the soil. Elevation may play a role in the effect. In general, higher elevations contain more organic matter compared to lower elevations such as sea level. Organic matter content of soil between 1600 to 4000 feet elevation can range from 2 to 3%.

It is believed that, while not bound by theory, protonation of the macronutrient adsorbed HAP nanoparticles leads to the release of the adsorbed macronutrient. Here, urea, due to its basicity, can be readily protonated. This may aid the release process.

In an embodiment of the slow release method, soil having a pH of 5 found at about 1600 feet from tea plantations in Kandy, Sri Lanka, can be used with macronutrient adsorbed HAP nanoparticles to release the macronutrient in a slow and sustained manner. In another embodiment, pot trials carried out with rice at the Rice Research and Development Institute, Sri Lanka (pH 5.5-6.0) can be used with macronutrient adsorbed HAP nanoparticles to slowly release the macronutrient. Even in sandy soils found at sea level (pH 7), for example in Colombo, Sri Lanka, where the organic content is lower than 2%, the slow and sustained release may be achieved. To summarize, while slow release of macronutrient compound will occur in soils having a pH range of 3.5 to 7.00, soils having acidic pH values in the range between about 4.2-6.5 are most preferred.

Release Behavior Through Foliage

In another embodiment, the aqueous dispersion obtained directly after the synthesis of the HAP-nitrogen containing macronutrient nanoparticles can be used to slowly release the macronutrient in foliar applications. Since leaf surface chemistry generally has a pH range between 5 and 7, such an aqueous formulation can release macronutrient as a foliar application in a local setting through manual application or on a wider scale by aerial spraying. These applications can be made multiple times during the life cycle of a plant as necessary.

EXAMPLES

Example 1

Template Synthesis Method a) Synthesis of HAP-Urea Nanocomposites by Template Synthesis Method $Ca(OH)_2$ solution (19.29 g, 250 ml) was prepared and stirred for half an hour. Urea (31.28 g) was added to the solution and stirred further for one hour. Then, $H_3PO_4$ (0.6 M, 250.0 ml) was added drop wise while stirring at 750 rpm. The solution was further stirred for 10 minutes after completion of the addition of phosphoric acid to yield a stable dispersion containing HAP-urea nanoparticles (HAP:Urea ratio 1:1). In a similar manner, HAP-urea nanoparticles were prepared with HAP:Urea ratios of 1:3, 1:4, 1:5 and 1:6 resulting in a foliage fertilizer formulation.

The dispersions that resulted can be dried in an oven at 60° C. or preferably flash dried to get the solid fertilizer compositions as chips or granules. These resulting chips or granules can be ground into a powder.

b) Morphology of HAP-Urea Nanocomposite: Template Synthesis Method

As seen in FIG. 1 (*a*), bead like nanoparticles (diameter 10-20 nm with uniform size) formed. The orientation attachment or directional growth was delayed as a result of the presence of surface modifiers such as amines, di-amines and amide group containing organic molecules which delay the directional growth of bead-like nanoparticles. However, with time it was observed (see FIG. 1(*b*)) that the bead-like particles attach in to the same bead-chain-like structure as observed with sol-gel synthesis method (described below), (10-15 nm diameter, 30-150 nm length). With the increase in the concentration of the template molecules (template molecule referred to herein is a heteroatom containing organic molecule such as an amine or an amide), directional growth of bead-like particles was controlled, resulting in a higher surface area in the nanostructures. Higher nanostructure surface area is preferred for more effective coating of plant nutrients and to increase the loading of nutrients onto the HAP.

A similar bead-chain-like structure was observed at lower urea encapsulation while the particles appeared to be more spherical in shape when the loading was increased. However even after a loading of 1:6 ratio of HAP:Urea, the composite displayed particle sizes below 100 nm.

Example 2 a) Synthesis of HAP-Urea Nanocomposites by Sol-Gel Method $H_3PO_4$ (0.6 M, 250 ml) was added drop-wise into a suspension of calcium hydroxide (19.29 g $Ca(OH)_2$ in 250 ml water), while stirring vigorously under mechanical agitation (1000 rpm). HAP-nanoparticle dispersion is created. The reaction takes place according to the following equation.

$$6H_3PO_4+10Ca(OH)_2 \rightarrow Ca_{10}(PO_4)_6(OH)_2+18H_2O$$

HAP nanoparticle synthesis was repeated at different experimental conditions varying the following parameters:

(i) Addition rate of reactants: direct addition of phosphoric acid to calcium hydroxide dispersion, phosphoric acid at 70 ml/min, phosphoric acid at 20 ml/min and phosphoric acid at 6 ml/min,
(ii) pH: 5, 7, 9 and 11
(iii) Addition method: spraying and drop wise addition
(iv) Stirring speed: 100, 200, 300, 400, 600 and 800 rpm
(v) Reaction temperature: 20° C., 30° C., 40° C. and 60° C.
(vi) Concentration of phosphoric acid: conc. $H_3PO_4$ (11 M) and 0.6 M Surface modification of HAP nanoparticles with urea was carried out as described below. Urea solution (1 M, 250 ml) was added drop wise into the above-prepared HAP nanoparticle dispersion. In a preferred embodiment 25 g of solid urea is added to the HAP dispersion. Using solid urea reduces the amount of water in the mixture, improving the drying process. The resulting solution was allowed to age further for 2 hrs at room temperature to yield a stable dispersion, which can be used for foliar applications or encapsulated within a biodegradable coating. Afterwards, the dispersion was dried at 60° C. overnight by use of oven drying or flash drying.

b) Morphology of HAP-Urea Nanocomposite: Sol-Gel Method

As can be seen with reference to the TEM image of FIG. 3(a), rod-like HAP nanoparticles are shown. These HAP nanoparticles were created by the Sol-Gel method described in Example 2 above.

FIG. 3(b) is a TEM image of HAP-urea nanocomposites. These HAP-urea nanocomposites were created by the Sol-Gel method described in Example 2 above.

Using the Sol-Gel method described in Example 2 above, bead-like nanoparticles (diameter 10-20 nm with uniform size) formed initially and quick directional growth leading to a bead-chain like structure (10-15 nm diameter, 30-150 nm length) was observed.

c) Effect of Reaction Conditions (i-vi)

(i) Effect of Addition Rate

Bead-like HAP nanoparticles with a diameter of approximately 10-35 nm were initially formed. Quick directional growth leading to bead-chain-like structures with 10-35 nm diameter and 150 nm length occurred with faster addition rates of phosphoric acid. Bead-chain-like morphology was observed for addition rate of 20 ml min$^{-1}$. Bead-chain-like morphology with a particle diameter of 10-60 nm, was observed for the slower rates 6 ml min$^{-1}$. Bead-chain-like nanostructures were longer in length with the decrease in the addition rate of phosphoric acid suggesting that the longer time duration allows more efficient directional growth of bead-like nanoparticles. It is most preferable for the fertilizer application disclosed herein to use the addition rate of 70 ml min$^{-1}$.

(ii) Effect of Solution pH

As shown in FIG. 8, bead-chain-like nanoparticle morphology was observed at all pH values of the final solution while a phase pure material was observed at all pH values studied. However, the particle diameter varied within a range of 10-100 nm. It was evidenced that the length of the bead-chain-like particles depends on the hydroxyl ion concentration in the solution. The length of the particles were longer when high concentrations of hydroxyl ions are used while the particle diameter does not significantly depend on hydroxyl ion concentrations.

(iii) Effect of Addition Method

As can be seen in FIG. 9, phase pure nanoparticles with a bead-chain-like morphology were observed for both the drop wise and spray methods of addition. Smaller particles (diameter 10-40 nm) with more uniform particle size distribution were observed for the more preferable spraying method.

(iv) Effect of Stirring Speed

Synthesis of HAP nanoparticles was carried out under different stirring speeds (100, 200, 400, 600 and 800 rpm) in a semi pilot plant reactor. Phase pure bead-chain-like nanoparticles (diameter 10-60 nm, length 50-100 nm) were observed under all tested stirring speeds. Particle diameter (ca. 60 nm) was observed for the lowest rate speed (100 rpm) and small particles with an average diameter ranging from 10-20 nm were observed for the highest, and most preferred, stirring speed of 800 rpm.

(v) Reaction Temperature

As shown with reference to FIG. 11, at lower temperatures, longer bead-chain-like structures (10-50 nm in diameter, 50-200 nm in length) were formed. With the increase in the reaction medium temperature more spherical particles were formed (10-50 nm in diameter) suggesting that higher temperatures are less favorable for directional growth. In a preferred embodiment, ambient temperature was used.

(vi) Concentration of Phosphoric Acid

With reference to FIG. 12, the size and morphology of the particles used with concentrated phosphoric acid was similar to the bead-chain-like nanoparticles (diameter 10-50 nm, 50-200 nm length) observed with 0.6 M phosphoric acid. It is more preferable to use concentrated phosphoric acid.

PXRD Characterization

PXRD studies on the HA nanoparticles synthesized were in close agreement with the reported results in the powder diffraction file for HA in the ICDD, (PDF No. 09-0432) with lattice parameters of a=9.42 Å and c=6.90 Å based on a hexagonal unit cell. No characteristic peaks of impurities such as $Ca(OH)_2$ and $Ca_3(PO_4)_2$ were observed suggesting the formation of phase pure HA prepared according to example 2. Polycrystalline nature of both HAP nanoparticles and Urea-HAP nanoparticle were confirmed by the diffraction data obtained by electron diffraction methods. The crystallite size as calculated according to Schrerrs formula is about 18 nm which may possibly corresponding to the nanospheres and further suggest that the directional growth occurs along c-axis.

Elemental Analysis

Energy Dispersive X-ray (EDX) analysis confirmed the presence of Ca (17.24%) and P (10.16%) which is in agreement with the expected Ca:P ratio of 1.67. Kjeldhal analysis confirmed the presence of 22%±3% nitrogen in the nanocomposite.

FTIR Characterization

The nature of the interactions between HA nanoparticles and urea molecules were studied by FTIR characterization. Specifically, the peak shifts in the FTIR spectrum of HA nanoparticles particularly broadening and to a lower wavenumber shift in the O—H stretching frequency predicts that the interactions have occurred through the O—H bond of the HA nanoparticles. Urea, the N—H stretching frequency appeared as a doublet at 3430 cm$^{-1}$ and 3340 cm$^{-1}$ which in urea bonded to HA nanoparticles had led to a noticeable peak broadening. Further, the change in the carbonyl stretching frequency of pure urea from 1682 cm$^{-1}$ to 1669 cm$^{-1}$ in urea adsorbed HA nanoparticles indicated that, as is expected, the C=O electron density was being affected by interaction between urea molecules and HA nanoparticles. This observation was lent further credence by a noticeable peak shift of the N—C—N stretching frequency (1460 cm$^{-1}$) of urea to a lower frequency in urea modified HA nanoparticles (1446 cm$^{-1}$).

Raman Spectroscopy

Raman spectroscopy analysis (as shown in FIG. 18) clarifies the bonding environment of Urea-HAP nanoparticle composite, particularly in the fingerprint region. As evidenced by the Raman spectroscopic data there is a noticeable shift in the peak at 800 cm$^{-1}$ in HA to 775 cm$^{-1}$ in Urea-HAP nanoparticle composite and in the peak around 825 cm$^{-1}$ in HA to 800 cm$^{-1}$ in Urea-HAP nanoparticle composite. These peaks may possibly arise from any metal ligand interactions, and can thus be assigned to any change in the coordination environment of the Ca ions suggesting the possibility of the presence of metal-ligand type interactions in addition to hydroxyl-carbonyl weak hydrogen bonding environment in Urea-HAP nanoparticle composite. This evidence may further suggest that the possibility of having coordination bonding between any positively charged Ca terminating face of HAP nanoparticles and amino groups of urea. These observations are in accord with the different types of bonding observed for bone (HAP nanoparticles) protein interactions. According to previous studies of bone-protein nanocomposites, there could be three different types of interactions between HAP nanoparticles and proteins, namely, (i) van Der Waals, (ii) coulombic and (iii) complex formation.

BET Analysis

BET surface area, pore size and average pore volumes of HAP nanoparticles and U-HA nanocomposites are summarized in Table 1.

TABLE 1

BET surface area, pore size and pore volumes of the HAP nanoparticles and U-HA nanocomposites.

| Sample | Bet Surface Area (m$^2$/g) | Pore size (nm) | Single Point Adsorption Total pore volume of pores less than d = 60.8014 nm at P/Po 0.96714194 (cm$^3$/g) |
|---|---|---|---|
| HA | 81 | 14 | 0.287050 |
| HA - Urea | 58 | 17 | 0.251985 |
| Nanoporous HA | 24 | 35 | N/A | d = Diameter

As evidenced by the BET analysis in Table 1, the HAP nanoparticles synthesized as described in this study have a significantly high surface area compared to literature values. The directional growth of bead-like nanoparticles into a bead-chain-like nanostructure may have introduced the observed unique features. The number of layers of urea molecules around one HAP nanoparticles calculated referring to the BET was 53, suggesting the presence of a nanocomposite where HAP nanoparticles are surrounded by urea molecules which are H-bonded to each other in an extended fashion representing a poly urea molecule.

Release Properties of Nitrogen (a) In Water

Method:

After adjusting the nitrogen content in each of the following samples to 20% of dry weight, they were used for evaluating the release of urea (N) in water:

(1) Urea (2) Urea—HAP nanoparticles (powdered and in chip form)

(3) Urea and HA (200-800 microns)

Urea adsorbed HAP-nanoparticles (5 g, powder form), Urea adsorbed HAP-nanoparticles (5 g, chips), Urea—HAP macroparticles (5 g, powder form), urea (2.15 g), all equalized to 20% of nitrogen of dry weight were used for the study of the release behavior in water.

Each of above samples was placed in a vessel partitioned with a semi-permeable membrane. The samples were allowed to equilibrate with water (25 ml) in one side of the membrane and diffuse through the semi-permeable membrane to the other side; samples were withdrawn at 1 hr intervals. The samples were analyzed using FTIR and for the appearance of the urea peak in each sample: The peaks were normalized with respect to O—H stretching frequency peak of water which did not shift and area under the peak was analyzed for N—C—N stretching frequency peak of urea. FIG. 19 summarizes the urea release behavior for these samples.

A similar procedure was followed to study the release behavior of aqueous solutions of HAP-Urea nanoparticle composites prepared with different HAP: Urea ratios (1:1-1:6). FIG. 20 summarizes the urea release behavior for these samples.

With reference to FIG. 19, a rapid release of urea in aqueous medium was observed for urea and the composite prepared with hydroxyapatite macroparticles. 75% of the total urea used was released within the first 50 hrs while a clear slow and sustained release was observed for Urea-HAP nanoparticle chip and Urea-HAP nanoparticle powder. A steady state was reached after 50 hrs. The amount of urea released after 120 hrs for the U-HA chip was estimated to be 85% while 90% of urea was released within the same time duration for the Urea-HAP nanoparticle powder. Both the powder phase and chip-like nanocomposites released almost 95-98% of urea added suggesting a more stable and uniform composite.

A similar release behavior in water was observed for the HAP-urea nanocomposite prepared by the template synthesis method.

With reference to FIG. 20, HAP-Urea nanoparticle composite with a ratio of 1:1 displayed the slowest release behavior compared to the other formulations with higher urea loadings. However, a similar pattern in rate of release of urea was observed with all the other formulations with different urea loading. The presence of increased urea amounts may weaken the H-bonding interactions between the urea molecules and HAP nanoparticles. Furthermore, the rate of release of urea in solution phase composite was significantly slower than that of the Urea-HAP nanoparticle composite obtained as solid chips.

(b) In Acidic Soil (pH 5.0)

Soil sample (400 g each of soil found at an elevation of 1600 feet in a tea plantation; pH 5.0) was mixed with 1.8 g of commercial urea fertilizer. The soil sample containing urea fertilizer was filled into a glass column. Similarly, three equal amounts of Urea-HAP nanoparticle composite (N—15.5%) having a N content equal to urea, were taken separately and filled into three glass columns containing three soil samples (three replicates). Next, 180 ml water was added to all four soil columns until they reached the soil water saturation point, and maintained the water content approximately constant throughout the period of study. Water (100 ml) was added at five day intervals prior to elution. The eluted solutions (50 ml) were collected for nitrogen analysis. Nitrogen analysis was done by the Kjeldhal (N) method.

At soil pH 5, sustained release behavior of nitrogen was shown by the nanocomposite based on Urea-HAP nanoparticle and gradual release behavior can be clearly identified with the increasing of cumulative nitrogen content up to 80$^{th}$ day in a slow manner, which is in agreement with a typical slow release profile presented by cumulative release vs. time in the literature. However, urea composition had released almost 50% of N within 25 days and release of nitrogen had leveled off at 70% after the 50$^{th}$ day. Only 60% of the urea was released even after the 80$^{th}$ day and the results were highly reproducible.

Bio-Availability Test—Using Rice as the Crop Plant

1—No fertilizer

2—Urea as recommended by the Department of Agriculture—Sri Lanka

3—½ the amount of urea as recommended by the Department of Agriculture—Sri Lanka 4—½ the amount of Urea-HAP nanoparticles composite containing N as recommended by the Department of Agriculture—Sri Lanka Pot trials conducted at the Rice Research and Development Institute, Sri Lanka, using rice as the model crop (see FIGS. 22-28) indicated an increase in the crop yield (grain weight/g per pot) using 50% N content (as compared to the recommended) was equal to or better than 100% N content in normal fertilizer. Significantly, one basal treatment of the nanoparticle composite was sufficient to meet the nitrogen demand of the plant during the total life span, compared with three bi-weekly applications in addition to the basal treatment when the conventional urea system (recommended by the Department of Agriculture, Sri Lanka).

What is claimed is:

1. A method of slowly releasing macronutrient to a plant locus
   a. providing a nanocomposite having nitrogen containing macronutrient compound adsorbed on the surface of hydroxyapatite phosphate nanoparticles and
   b. applying said nanocomposite to soil.

2. The method of claim 1 further comprising contacting the nanocomposite with the soil more than once within a period of three months.

3. The method of claim 1 wherein the nanocomposite is aqueously dispersed.

4. The method of claim 3 further comprising contacting the nanocomposite with the foliar parts of a plant.

5. The method of claim 4 further comprising contacting the nanocomposite with the foliar parts of a plant more than once within a period of three months.

6. The method of claim 1 wherein the plant locus comprises a tea plant locus.

7. The method of claim 1 wherein the plant locus comprises a rice plant locus.

8. The method of claim 1 wherein the plant locus comprises a rubber plant locus.

9. The method of claim 1 wherein the plant locus comprises a coconut plant locus.

10. The method of claim 1 wherein the plant locus comprise a corn (maize) plant locus.

11. The method of claim 1 wherein the plant locus comprises a short term cash crops.

12. The method of claim 1 wherein the soil has a pH range between 4.2 to 6.5.

13. A method of preparing a sustained release fertilizer composition comprising:
    a. preparing an aqueous $Ca(OH)_2$ and nitrogen containing macronutrient dispersion;
    b. adding phosphoric acid to the aqueous $Ca(OH)_2$ and nitrogen containing macronutrient dispersion.

14. The method of claim 13 wherein the nitrogen containing macronutrient is urea.

15. The method of claim 14 wherein the aqueous dispersion is dried.

16. The method of claim 14 where the ratio of urea to hydroxyapatite phosphate is between (w/w) 1:1 to 1:6.

17. The method of claim 15 wherein the ratio of urea to hydroxyapatite phosphate is about (w/w) 1:1.

18. A fertilizer composition comprising a nitrogen containing macronutrient adsorbed on the surface of hydroxyapatite phosphate nanoparticles.

19. The fertilizer composition of claim 18 wherein the fertilizer composition is a solid; wherein the nitrogen containing macronutrient is urea: and wherein the ratio of urea to hydroxyapatite phosphate is about (w/w) 1:1.

* * * * *